(12) United States Patent
Kati et al.

(10) Patent No.: US 10,709,078 B2
(45) Date of Patent: Jul. 14, 2020

(54) SEAWEED FARMING SYSTEM

(71) Applicant: SEA6 ENERGY PRIVATE LTD., Bangalore (IN)

(72) Inventors: Nitish Kati, Mumbai (IN); Nelson Vadassery, Bangalore (IN); Shrikumar Suryanarayan, Bangalore (IN); Hrishikesh Ranjalkar, Bangalore (IN); Chaitanya Praveen Nandigama, Bangalore (IN); Sowmya Lakshmi Balendiran, Bangalore (IN); Sri Sailaja Nori, Bangalore (IN)

(73) Assignee: Sea6 Energy Private Ltd., Bangalore (IN)

( * ) Notice: Subject to any disclaimer, the term of this patent is extended or adjusted under 35 U.S.C. 154(b) by 0 days.

(21) Appl. No.: 16/542,838

(22) Filed: Aug. 16, 2019

(65) Prior Publication Data

US 2020/0137969 A1  May 7, 2020

Related U.S. Application Data

(62) Division of application No. 15/021,206, filed as application No. PCT/IB2014/001797 on Sep. 12, 2014.

(51) Int. Cl.
*A01G 33/00* (2006.01)
*A01D 44/00* (2006.01)

(52) U.S. Cl.
CPC .............. *A01G 33/00* (2013.01); *A01D 44/00* (2013.01)

(58) Field of Classification Search
CPC ......... A01G 33/00; A01D 44/02; A01D 44/02
See application file for complete search history.

(56) References Cited

FOREIGN PATENT DOCUMENTS

| EP | 2475776 A1 | * | 7/2012 | ............... C12P 7/06 |
|----|------------|---|--------|--------------------------|
| EP | 2475776 A1 |   | 7/2012 |                          |
| JP | 2008-149935 A |   | 7/2008 |                       |
| JP | 2011-067173 A |   | 4/2011 |                       |
| KR | 10-2012-0010440 A |   | 2/2012 |                   |
| WO | WO 2011/027360 A1 |   | 3/2011 |                   |

OTHER PUBLICATIONS

International Preliminary Report on Patentability and Written Opinion of the International Searching Authority dated Mar. 15, 2016 for International Application No. PCT/IB2014/001797 (8 pp.).
International Search Report and Written Opinion of the International Searching Authority dated Jan. 15, 2015 in International Application No. PCT/IB2014/001797 (10 pp.).

* cited by examiner

*Primary Examiner* — Monica L Barlow
*Assistant Examiner* — Aaron M Rodziwicz
(74) *Attorney, Agent, or Firm* — Brinks Gilson & Lione

(57) ABSTRACT

A seaweed farming system may include a harvesting unit. The harvesting unit may include a harvest disintegrator. The harvest disintegrator may be configured to receive a plantation substrate having mature seaweed thereon after severing a vegetative portion of seaweed. The harvesting unit may further be configured to disintegrate the mature seaweed to separate the mature seaweed from the plantation substrate, the plantation substrate remaining intact during separation of the mature seaweed.

5 Claims, 20 Drawing Sheets

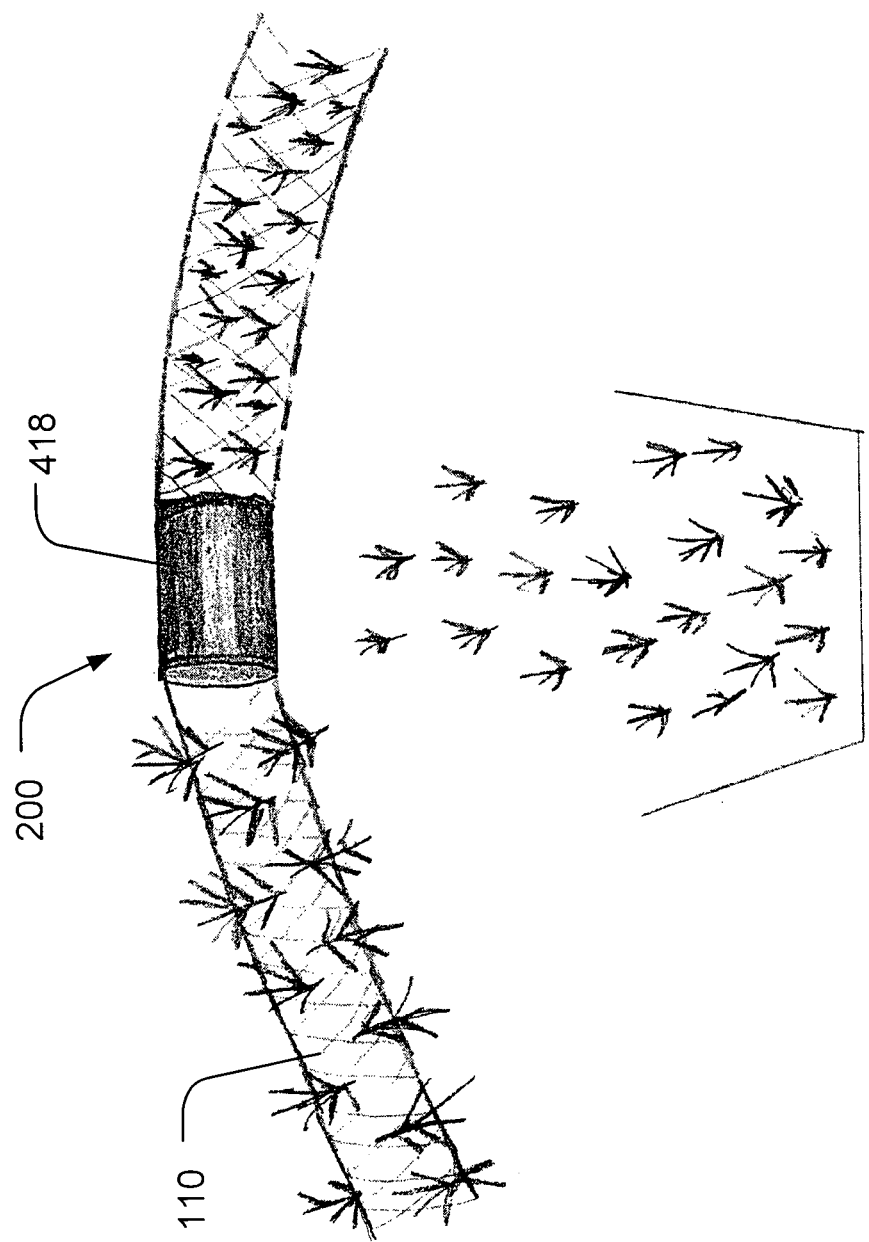

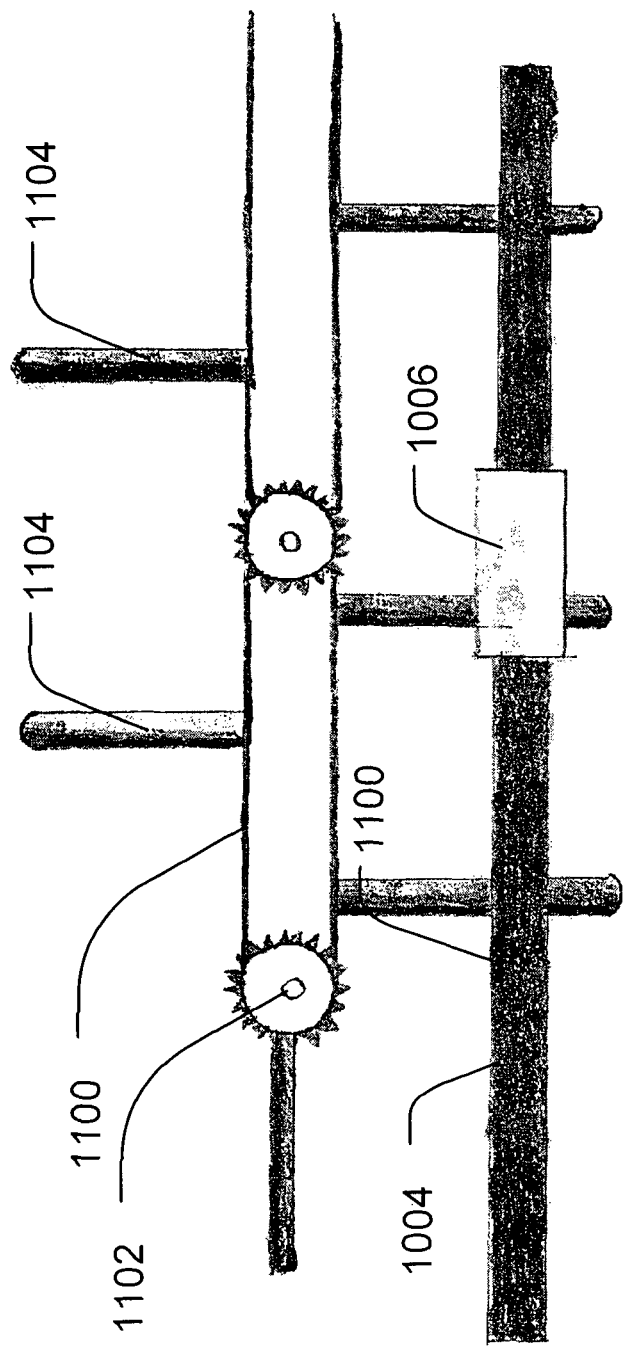

US 10,709,078 B2

SEAWEED FARMING SYSTEM

RELATED APPLICATIONS

The present application is a divisional of U.S. patent application Ser. No. 15/021,206 (filed Mar. 10, 2016), which is a National Stage of International Application No. PCT/IB2014/001797 (filed Sep. 12, 2014), which claims priority to India Patent Application No. 4133/CHE/2013 (filed Sep. 13, 2013). All applications listed in this paragraph are hereby incorporated by reference in their entireties.

TECHNICAL FIELD

The present subject matter relates, in general, to farming implements and particularly, but not exclusively, to a seaweed farming system.

BACKGROUND

Aquatic plants, popularly known as seaweeds, form one of the important living resources of the ocean. Seaweeds are used in a large number of applications, including food for human consumption and also for commercial purposes. For example, carrageenan is a gelling agent extracted from red seaweeds, and is used as an emulsifier, a binder, or for suspension and stabilization in a wide range of products in the food processing, pharmaceutical, and cosmetic industries. Therefore, such aquatic plants are generally grown on a commercial scale.

Seaweed farming is the practice of cultivating and harvesting seaweeds. Today, seaweed production and processing have become a high value and important livelihood activity in many marginal sea farming communities as well as enterprises in urban centres of the country. Generally, seaweed farming is a very labour intensive activity involving substantial amount of human labour during various stages of cultivation and harvesting. Further, while certain seaweeds are cultivated from seeds and spores and have a distinct seeding and harvesting season, certain other types of seaweed, such as *Kappaphycus* and *Gracilaria*, do not have a distinct seasonality for seeding and cultivating.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4a-2 illustrates an exploded view of the seed cutter, in accordance with an embodiment of the present subject matter.

FIGS. 4b-1 and 4b-2 illustrate the seed cutter of the harvesting unit, in accordance with another embodiment of the present subject matter.

FIG. 4c illustrates the seed cutter of the harvesting unit, in accordance with one other embodiment of the present subject matter.

FIG. 8b-1 illustrates a substrate cartridge of the seeding unit, in accordance with an embodiment of the present subject matter.

FIGS. 11a and 11b illustrate the propulsion mechanism of the seaweed farm operating assembly, in accordance with another implementation of the present subject matter.

DETAILED DESCRIPTION

Figure 1A:
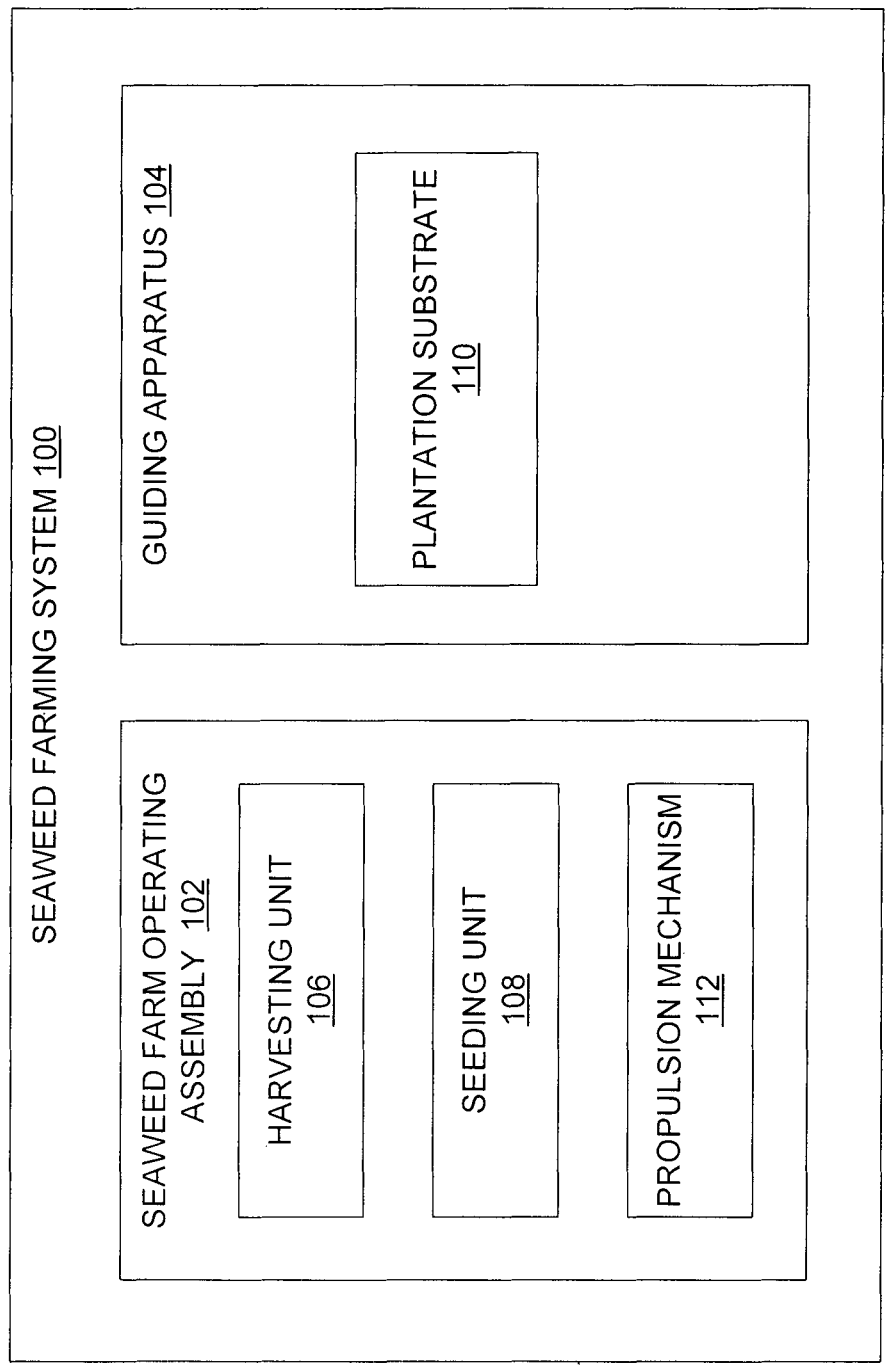
FIGS. 1a and 1b illustrate schematics of a seaweed farming system, in accordance with an embodiment of the present subject matter.
Figure 1B:
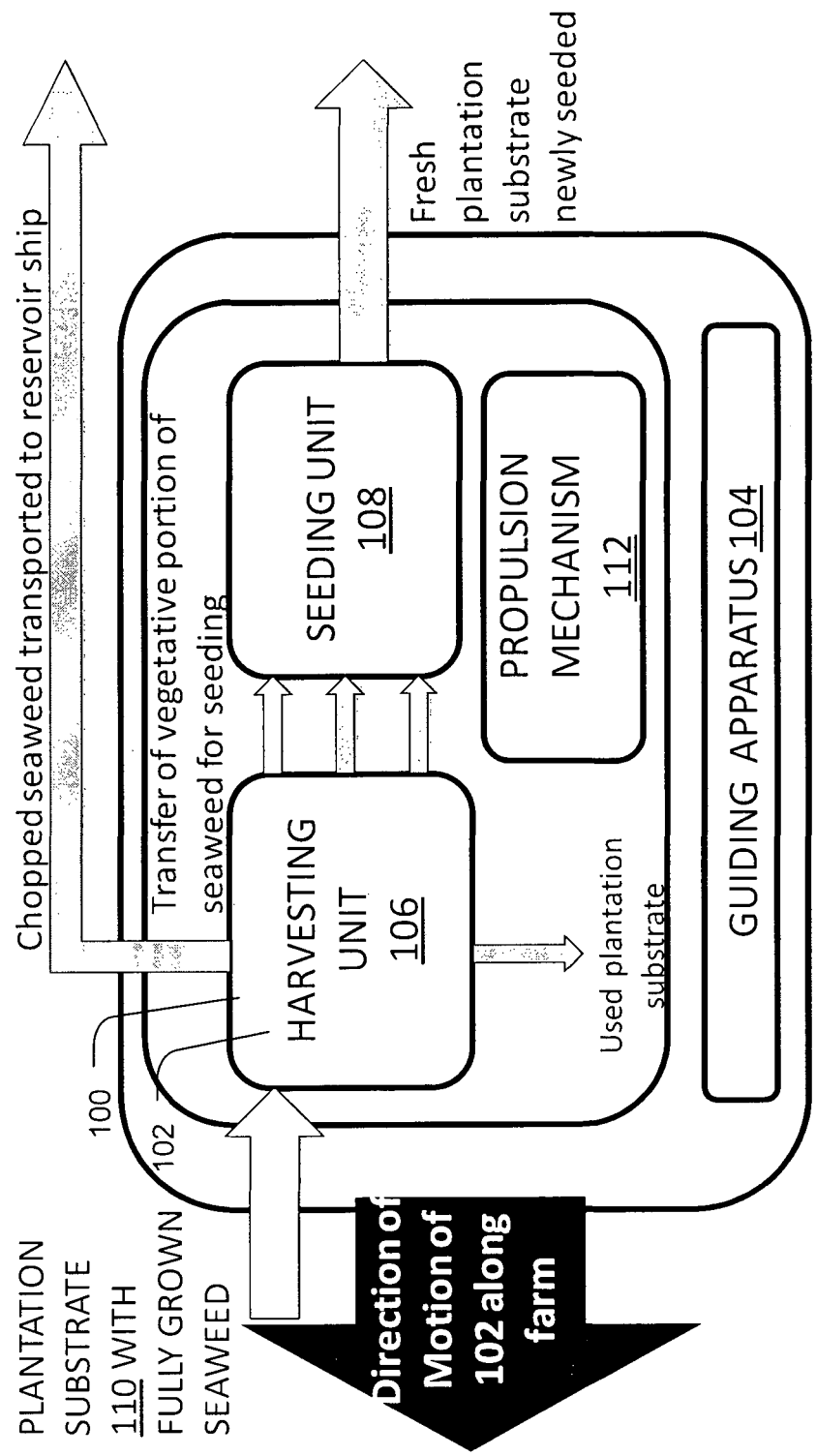

The present subject matter relates to a seaweed farming system.

Naturally occurring aquatic plants or seaweeds find a plurality of applications in pharmaceutical and medical industry and the food processing industry. For example, seaweed is used as food in numerous countries, such as Japan, China, and Republic of Korea, and fresh seaweeds are traditionally used as vegetables and in salads. On the other hand, in another example, various red and brown seaweeds are commercially used to produce three hydrocolloids, namely, agar, alginate, and carrageenan, which dissolve in water to give a viscous solution. In the above example, alginate, agar, and carrageenan are water-soluble compounds that are used to increase the viscosity of aqueous solutions, to form gels of varying degrees of firmness, to form water-soluble films, and to stabilize products, such as ice cream. Other uses of seaweed generally include seaweed meal used as an additive to animal feed, and dried sea weed used in oil-fired furnaces and fertilizer.

Seaweeds can either be cultivated vegetatively where small pieces of seaweed are taken and placed in an environment that is able to sustain their growth, or can be cultivated from their spores which germinate to grow into the whole plant eventually. For example, few types of seaweed are cultivated from seeds and spores and have a distinct seeding and harvesting season depending on their biological lifecycles, whereas few other types of seaweeds do not have a distinct seasonality for seeding and cultivating. In both the cases, the seaweed can either be naturally growing utilizing the seabed as the fostering environment, or can be grown on an artificial substrate. In case of naturally growing seasonal seaweeds, when the plant has grown to a suitable size it is harvested. In such a case, the cultivation is generally done by removing most of the plant but leaving a small part of the plant to grow back again.

Further, in the latter case, in which the seasonal seaweed is grown using the artificial substrate, the seaweed may be grown on ropes, nets, or flexible polymers, suspended in water by tying to stationary objects, such as embedded poles or a floating frame. For example, the seeds or spores of the seaweed are obtained at a certain point in the lifecycle of the seaweed, and are attached to the artificial substrates. The substrate impregnated with the spores of the seaweed is then deployed back into water. These spores germinate and grow to form a full fledged plant.

On the other hand, in case of non-seasonal seaweed, the harvesting is done to obtain the crop and the younger and faster-growing portion of the crop is used as seed, collectively referred to as propagules, for the crop. Accordingly, the propagules are obtained at the time of harvesting of the crop of seaweed. Further, the cultivation of such type of seaweed is usually done manually. Conventionally, the crops are brought on-shore after harvesting, the good quality propagules are then separated from the harvest by hand after visual inspection, attached to an artificial substrate, and the impregnated substrate is carried and deployed in water. After a few weeks, the propagules grow to their full size and the substrate is ready for harvest. However, manual harvesting of the crops can be inefficient as it is time consuming and is resource intensive.

Further, while manually harvesting the crop, the fast growing portion of the seaweed may not be appropriately separated from rest of the crop and the propagules hence obtained may be of inferior quality. In addition, in both the above mentioned cases, a considerable amount of time may lapse between harvesting the crop and deploying the propagules back in water. This may primarily happen because of the time involved in bringing the harvested crops back to shore, identifying and separating good quality propagules from the crop, and attaching the propagules to the substrate. During this period, the propagule is typically away from seawater and exposed to air. Lack of availability of seawater and exposure to air for the time-gap between the harvesting of the crop and the deployment of the propagules in water for regeneration of the seaweed may adversely affect health of the propagule. The greater the time elapsed between the harvesting and seeding of the propagule, the worse the condition of the propagules may become. Further, the adverse effect of delay in seeding may reflect in the crop obtained from such propagules.

In addition, while deployment of the propagules, the substrate may be laid in the ocean in many ways. In many cases, these substrates are laid out on shallow ocean beds, for example, where water depth is less than about 1 metre during low tide. In such a case, with the help of poles driven into the sandy sea bottom, the substrates may be laid out in long lines parallel to each other and attached to floats to keep the substrate floating on the ocean surface. In addition, the substrates can be tied onto a rectangular rope frame to help space them apart. The rope frame itself maintains its shape due to anchors holding them in tension. Another method involves laying the substrates out on a semi-submerged truss structure suspended less than about a metre from the water surface, with the help of buoys.

Additionally, the harvesting of the plantation substrates may be done either by cutting a substantial vegetative portion of the seaweed and allowing the remaining seaweed to grow back, or by harvesting the entire plant. In the latter case, the plantation substrate containing the seaweed is brought ashore where the vegetative portion is separated from the fully grown seaweed. For further use, good quality propagules are identified and selected manually before they are impregnated into new or cleaned plantation substrates. In addition, harvesting of part of the seaweed from the plantation harvests, as in the former case, may cause the plantation substrate along with the remaining seaweed to continuously be in water. Consequently, in such a case, the plantation substrate and the seaweed can act as a medium of attachment for various kinds of unwanted aquatic species which can either compete with the crop seaweed for nutrients or may act as parasites on the seaweed and extract nutrients from the seaweed.

Conventionally, for harvesting the seaweed, a vehicle, such as a boat, can be moved along the embedded substrate from which the crop of seaweed is to be harvested. While, the vehicle moves along the artificial substrate, the crop is manually harvested. Subsequently, the propagules are obtained manually from the harvest, and are manually embedded in a fresh substrate and the substrate is then deployed in water. The fresh substrate can include a new substrate or the previously used substrate which has been cleaned and has the seaweed removed therefrom. In such a case, the movement of the vehicle is either free in all directions or can be achieved along the substrates, such as ropes or nets. Such movement may not be effective to sufficiently cover the entire region in which the seaweed is to be cultivated. In addition, the neighbouring ropes and nets may entangle with each other, causing damage to the crop and adding to the cost of cultivating the seaweed. Conventionally, positioning and guiding of marine vessels along certain coordinates in the sea is achieved by remote assistance, for example, by using global position system (GPS) and dynamic thrusters. However, maintaining the position and guiding the vehicle based on the GPS is a complex task and prone to errors. In addition, the infrastructure for remote assistance is considerably cost intensive and may not be a viable option for guiding vehicles for seaweed farming.

According to an aspect of the present subject matter, a seaweed farming system for farming of seaweed in a water body is described herein. In an example, the seaweed can be the type which does not have a distinct seeding and harvesting season and a portion of the seaweed can be used as seed for further cultivating the seaweed. For instance, tips of the seaweed can be used as a seed. Accordingly, in an embodiment, the seaweed farming system includes a seaweed farm operating assembly having a harvesting unit and a seeding unit on the same implement. In said embodiment, the harvesting unit pulls plantation substrate, referred to as substrate, with the mature seaweed and separates the fast growing portion, i.e., the vegetative portion, of seaweed from mature seaweed growing on the plantation substrate. The plantation substrate can be laid out on the ocean in one of the many ways described previously involving the seaweed farming system, on top of which the seaweed farm operating assembly can move The vegetative portion of the seaweed can be understood as the portion which can be used for further seeding the seaweed, and is also referred to as propagule. In an example, the propagule is primarily composed of young and fast growing tissues of the seaweed plant. Further, the mature seaweed can be understood as the crop of seaweed which is to be harvested. In addition, in said embodiment, the seeding unit can receive the vegetative portion or the propagules of the seaweed from the harvesting unit and seed the propagules in a fresh plantation substrate. The fresh substrate can include a new substrate or the previously used substrate which has been cleaned and has the seaweed removed therefrom.

According to an implementation, for harvesting the seaweed, the harvesting unit can include a substrate puller to draw the plantation substrate. The substrate puller can draw the plantation substrate towards a seed cutter of the harvesting unit. The seed cutter, in said implementation, severs the propagules from the mature seaweed growing in the plantation substrate. Further, a conveyor can carry the severed propagules to the seeding unit for seeding from the seed cutter. The seeding unit can seed the propagules for further farming of seaweed, whereas the harvesting unit can further process the mature seaweed and provide the processed mature seaweed for storage to a reservoir.

During the seeding of the plantation substrate, the propagules are placed close to a central axis of the plantation substrate, say a tubular structure. As the seaweeds begin to grow, they grow outwards from the central axis. When the plantation substrate is ready for harvesting, the portion of the seaweed furthest away from the core central axis is the youngest and the fastest growing portion, i.e., the propagule. Hence, shearing away the portion of the seaweed which lies on the peripheral portions of the plantation substrate provides good quality propagules with high growth rates.

In an implementation, the seed cutter can be a rotary cutter and can have a first blade, and a second blade concentrically disposed with respect to the first blade. In an example, both the first and the second blade can be cylindrical. Further, in said example, the second blade can be rotatable with reference to the first blade about a common central longitudinal axis thereof and of the stationary peripheral blade. In said implementation, the second blade and the first blade can be provided with cutting teeth on the cutting edge, and the relative motion between the two blades can cause the cutting edges to function as shearing edges to cut the propagules from the mature seaweed. The cutting edges can be understood as those edges which directly come in contact with the seaweed crop for harvesting. In another implementation, the seed cutter can be a comb-cutter having a first set of blades and a second set of blades, both sets comprising a plurality of substantially flat blades parallel to each other. A surface of the first set of blades is provided as being abutted against a surface of the second set of blades, and the first set of blades is movable with reference to the second set of blades along the abutting surfaces. In said implementation, the two sets of blades can be provided with cutting teeth on the cutting edge, and the relative motion between the two blades can cause the cutting edges to function as shearing edges to cut the propagules from the mature seaweed. In yet another implementation, the seed cutter can be a single blade rotary cutter. During operation, the substrate puller can draw the plantation substrate for harvesting through the seed cutter along the central longitudinal axis. Accordingly, the seed cutter can cut peripheral portion of the seaweed, i.e., the propagule, from the mature seaweed.

Further, downstream to the seed cutter, the harvesting unit can be provided with a substrate separator to separate the plantation substrate from remaining mature seaweed. In an example, the harvesting unit can further include a substrate cutter to cut the separated plantation substrate to completely separate the remaining mature seaweed from the plantation substrate. In addition, the harvesting unit may further include a harvest disintegrator to disintegrate the separated mature seaweed before providing the mature seaweed for storage.

In an example, the seaweed farm operating assembly can also include a transporting unit to pump the mature seaweed from the seaweed farming system to a reservoir. Accordingly, the seaweed farm operating assembly can transport the harvested seaweed to the reservoir, say on a ship. As a result, the size of the seaweed farm operating assembly and the entire seaweed farming system can be small, since the reservoir is not on the seaweed farming system. Moving the seaweed reservoir away from the seaweed farm operating assembly has an additional advantage in that it reduces the draft of the boat, or the depth to which the implement is submerged.

With reference to the seeding unit, the seeding unit of the seaweed farming system can include a substrate cartridge on which fresh plantation substrate can be mounted for the seeding of the propagules obtained from the harvesting unit. The seeding unit can further include a fresh substrate puller to draw the fresh plantation substrate from the substrate cartridge, and a seed feeder for providing the propagule, i.e., the vegetative portion of the mature seaweed to the fresh plantation substrate for sowing the propagules in the fresh plantation substrate. In an example, the propagules are provided on the fresh plantation substrate and the plantation substrate impregnated with the propagules is then mounted on a guiding apparatus of the seaweed farming system. In one case, the guiding apparatus can be formed as a floating frame floating on the surface of the water. The floating frame can provide for guiding the seaweed farm operating assembly over a surface of the water body during operation, i.e., during harvesting and cultivating the seaweed. The floating frame can form guide rails for steering the seaweed farm operating assembly thereon, and the floating frame being coupled to a plurality of floaters to keep afloat on the surface of the water body. In addition, the floating frame can be tied down with the help of one or more anchors so that the position of the floating frame on the surface of the water body remains unchanged. In an implementation, the floating frame can be formed by a plurality of longitudinal elements connected to each other to form parallel guide rails for guiding the seaweed farm operating assembly during operation. According to an implementation, each of the plurality of longitudinal elements is connected to the adjacent longitudinal element by a flexible coupling, such as a universal joint.

As would be understood from the foregoing description, the propagules obtained from the seaweed are sowed back for the next cycle within a very short time. As a result, the propagules are fresh, healthy, and provide a high quality crop in the next cycle. Further, since the propagules are obtained from each cycle of crops, the quality of the seaweed obtained can be sustained in each crop cycle. In addition, the provision of the seaweed farm operating assembly in a single unit can perform the operation of harvesting and seeding at the same location. Such a provision, therefore, substantially precludes the exposure of the propagules to the air by preventing the propagules to stay out of water for long durations. Further, considerable amount of resources, in terms of time, transportation infrastructure, and fuel, are saved with the seaweed farming system of the present subject matter, in comparison to the conventional techniques of sequentially, harvesting and seeding of seaweed.

Further, in one embodiment of the present subject matter, the seaweed farm operating assembly can include a propulsion mechanism which can provide for propulsion of the seaweed farm operating assembly on the guiding apparatus over a surface of the water body along a predetermined path, say on the floating frame, during operation, i.e., during harvesting and cultivating the seaweed. Accordingly, the propulsion mechanism provides for a regulated movement of the seaweed farm operating assembly with respect to the floating frame, i.e., in a predictable manner. In another example, the guiding and propulsion mechanism can be formed as single unit and can include a platform for mounting the seaweed farm operating assembly, and the propulsion mechanism is coupled to the platform for propelling the seaweed farm operating assembly on the floating frame.

In an implementation, the propulsion mechanism can include a plurality of guide wheels, each guide wheel provided for cooperating with the floating frame for guiding the seaweed farm operating assembly. In an example, each of the plurality of guide wheels is formed by two sets of radially extending spokes for guiding the seaweed farm operating assembly on the floating frame. In an example, the spokes interact at the junction points of the floating truss to provide a forward thrust, say in the same manner as a rack-and-pinion gear system. Further, each guide wheel can be coupled to an actuator for driving the guide wheel, and the actuators can be, in turn, coupled to a controller for controlling respective actuator of the plurality of guide wheels to regulate movement of the seaweed farm operating assembly on the floating frame.

In another implementation, the propulsion mechanism can be a belt-type drive. In said implementation, the propulsion mechanism can include a plurality of drive belts, and each drive belt can be provided with a plurality of extension elements which are substantially perpendicular to the belt, say a mating surface of the belt, operating similar to the spokes, to cooperate, with the floating frame for guiding the seaweed farm operating assembly. In an example, the extension elements interact at the junction points of the floating truss to provide a forward thrust, say in the same manner as a rack-and-pinion gear system. As mentioned previously with reference to the former implementation of the propulsion mechanism, each drive belt can be provided with a drive mechanism for providing propulsion to the drive belt, and each drive mechanism can be coupled to a controller for controlling respective drive mechanism of the plurality of drive belts to regulate movement of the seaweed farm operating assembly on the floating frame.

In other implementations, the same seaweed farming system can easily be adapted to other modes of seaweed cultivation which do not require a floating frame design for guidance and propulsion. Accordingly, the seaweed farm operating assembly can move over the seaweed farm using other modes of guiding and propulsion. For instance, the seaweed farming system can employ a propeller based system, a water jet system, or other similar mechanisms to provide thrust in water coupled with a guidance mechanism which allows the system to move in a predictable way on the water surface. In an example, the guiding apparatus can include guide cables or ropes for facilitating the movement of the seaweed farm operating assembly, say to move in a straight line on the water surface. Further, in case the seaweed farming system is implemented in extremely shallow waters, the propulsion mechanism may be adapted to interact with the seabed to propel the system forward. For instance, the propulsion mechanism can include a set of wheels or a belt drive riding on the bottom surface of the water body.

With the provision of the guiding apparatus and the propulsion mechanism, the operation of the seaweed farming system is effective as well as convenient. Since the seaweed farm operating assembly is permanently coupled to the floating frame, the entire seaweed farming system moves on the water surface as a single unit. As a result, the relative position of the seaweed farm operating assembly with reference to the floating frame is always constant. Accordingly, positioning and guiding the seaweed farm operating assembly along the floating frame is considerably simple. In addition, no energy is to be expended in maintaining the position of the seaweed farm operating assembly on the surface of water. The flexible couplings of the floating frame further allow the floating frame to easily accommodate the movement of the water along the surface without being damaged and without causing damage to other components of the seaweed farming system.

According to another embodiment, instead of being mobile as explained above, the seaweed farming system can be static. In an example, the seaweed farming system can be placed on a static platform on the sea, a boat, a pier, or can be placed on the shore. Further, as explained above, the harvesting unit can obtain plantation substrate on which mature seaweed grows and harvest the mature seaweed and the seeding unit can seed the propagules in a fresh plantation substrate by disposing the seeded plantation substrate in water, still considerably preventing delay in plantation and substantially avoiding the propagules to be out of water for long durations.

These and other advantages of the present subject matter would be described in greater detail in conjunction with the figures in the following description. While aspects of the seaweed farming system can be implemented in any number of different configurations, the present subject matter is described in the context of the following embodiments.

Figures 1, 4A:
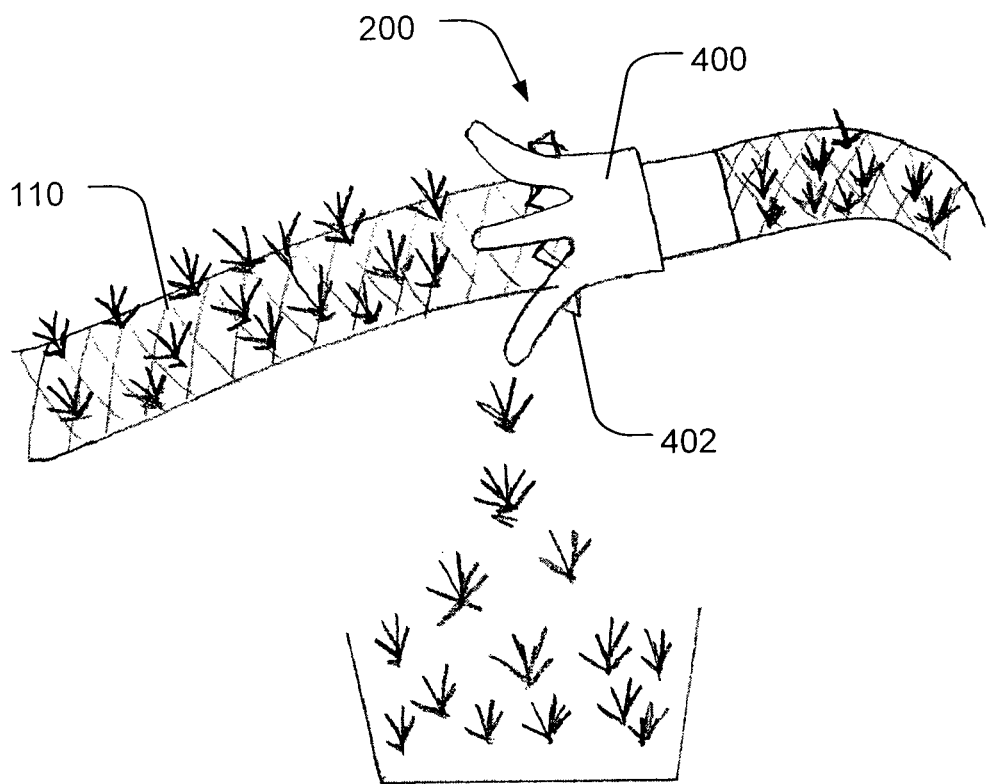
FIG. 4a-1 illustrates a seed cutter of the harvesting unit, in accordance with an embodiment of the present subject matter.

FIGS. 1 *a* and 1 *b* illustrate a schematic of a seaweed farming system 100, in accordance with an embodiment of the present subject matter. In an example, the seaweed can be of the type which does not have a distinct seeding and harvesting season, and a portion of the seaweed can be used as seed for further cultivating the seaweed. For instance, tips of the plant of the seaweed can be used as a seed. For the sake of brevity, the description of FIGS. 1 *a* and 1 *b* is provided in conjunction.

According to said embodiment, the seaweed farming system 100 includes a seaweed farm operating assembly 102 and a guiding apparatus 104. Further, the seaweed farm operating assembly 102 can include a harvesting unit 106, a seeding unit 108, and a propulsion mechanism 112. The harvesting unit 106 can obtain plantation substrate 110 on which mature seaweed grows and harvest the mature seaweed. In an example, the plantation substrate 110 can be disposed on a frame of the guiding apparatus 104 where the growth of the seaweed occurs during growth period.

During operation of harvesting the mature seaweed, the harvesting unit 106 separates vegetative portion of the mature seaweed, referred to as propagule, from the remaining seaweed. The vegetative portion or the propagules can be understood as vigorously growing portion of the seaweed which can be used as a seed for further cultivation of the seaweed. Further, the harvesting unit 106 provides the propagules to the seeding unit 108 for further sowing the propagule.

Subsequently, the seeding unit 108 seeds the propagules in a fresh plantation substrate 110 and disposes the seeded plantation substrate 110 in water, considerably preventing delay between separation of the propagules from the mature seaweed and re-plantation of the propagules. The fresh plantation substrate 110 can include a new substrate or the previously used seeded substrate 110 which has been cleaned and has the seaweed removed therefrom. On the other hand, the remaining seaweed is transported to a reservoir by the harvesting unit 106. In an example, the harvesting unit 106 can process the harvested seaweed before transporting to the reservoir. Further, in an example, the reservoir can be provided on a ship, off-board the seaweed farming system 100.

In an embodiment, the propulsion mechanism 112 can be coupled to the seaweed farm operating assembly 102 and can provide for the movement of the seaweed farm operating assembly 102 on the guiding apparatus 104 over the surface of water in a predictable fashion. In addition, the guiding apparatus 104 can be provided with a controller (not shown) for regulating the movement of the seaweed farm operating assembly 102. The guiding apparatus 104 and the propulsion mechanism 112 are explained in detail with reference to FIGS. 10, 11a, 11b, 12, and 13.

Figure 1C:
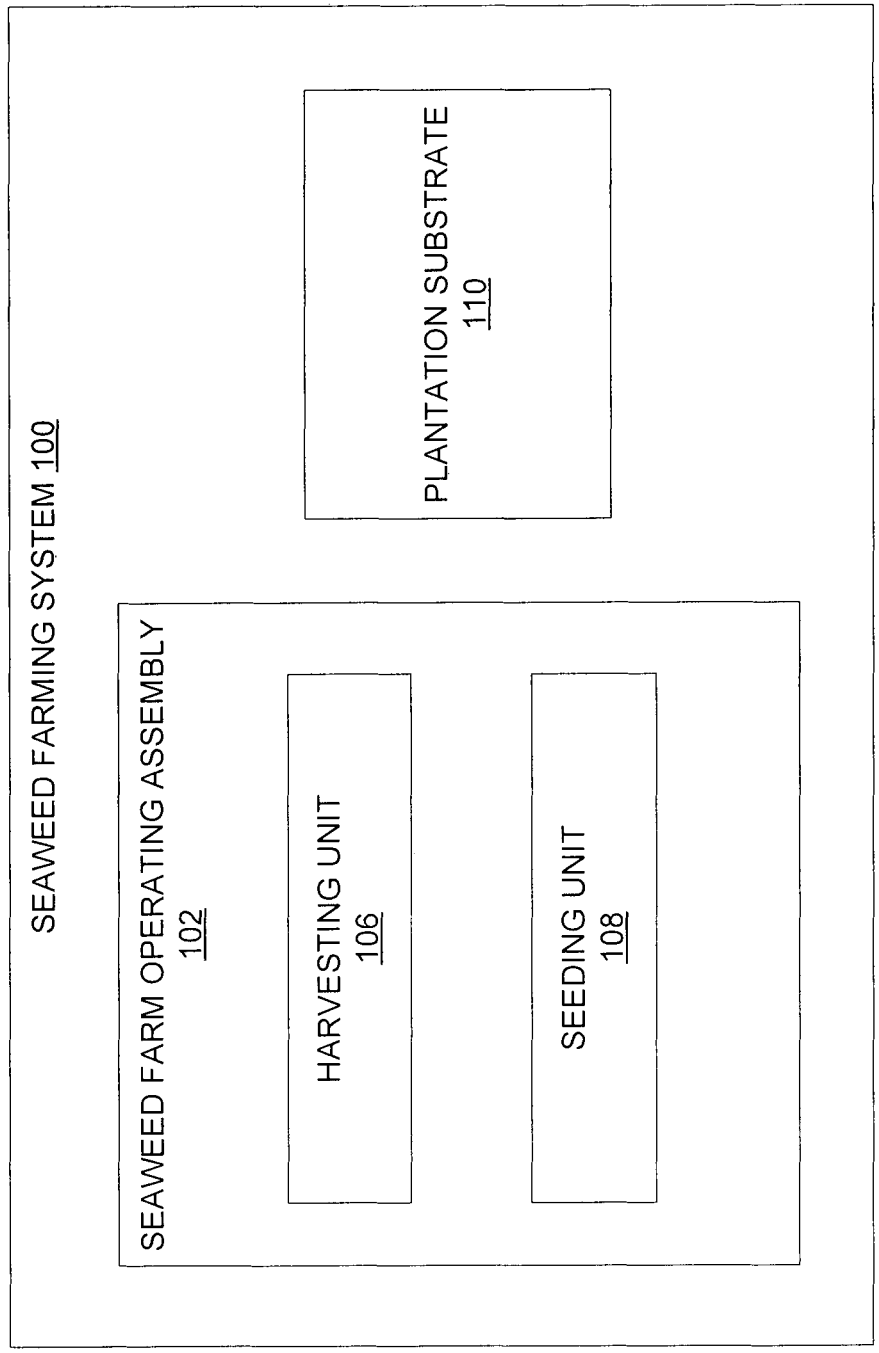
FIG. 1c illustrates a schematic of the seaweed farming system, in accordance with another embodiment of the present subject matter.

FIG. 1c illustrates a schematic of the seaweed farming system 100, in accordance with another embodiment of the present subject matter. According to said embodiment, instead of being mobile, the seaweed farming system 100 can be a static platform. In an example, the seaweed farming system 100 can be placed on a static platform on the sea, a boat, a pier, or can be placed on the shore. In such cases, the harvesting unit 106 can obtain plantation substrate 110 on which mature seaweed grows and harvest the mature seaweed and the seeding unit 108 can seed the propagules in a fresh plantation substrate 110 by disposing the seeded plantation substrate 110 in water, still considerably preventing delay in plantation.

Figure 2A:
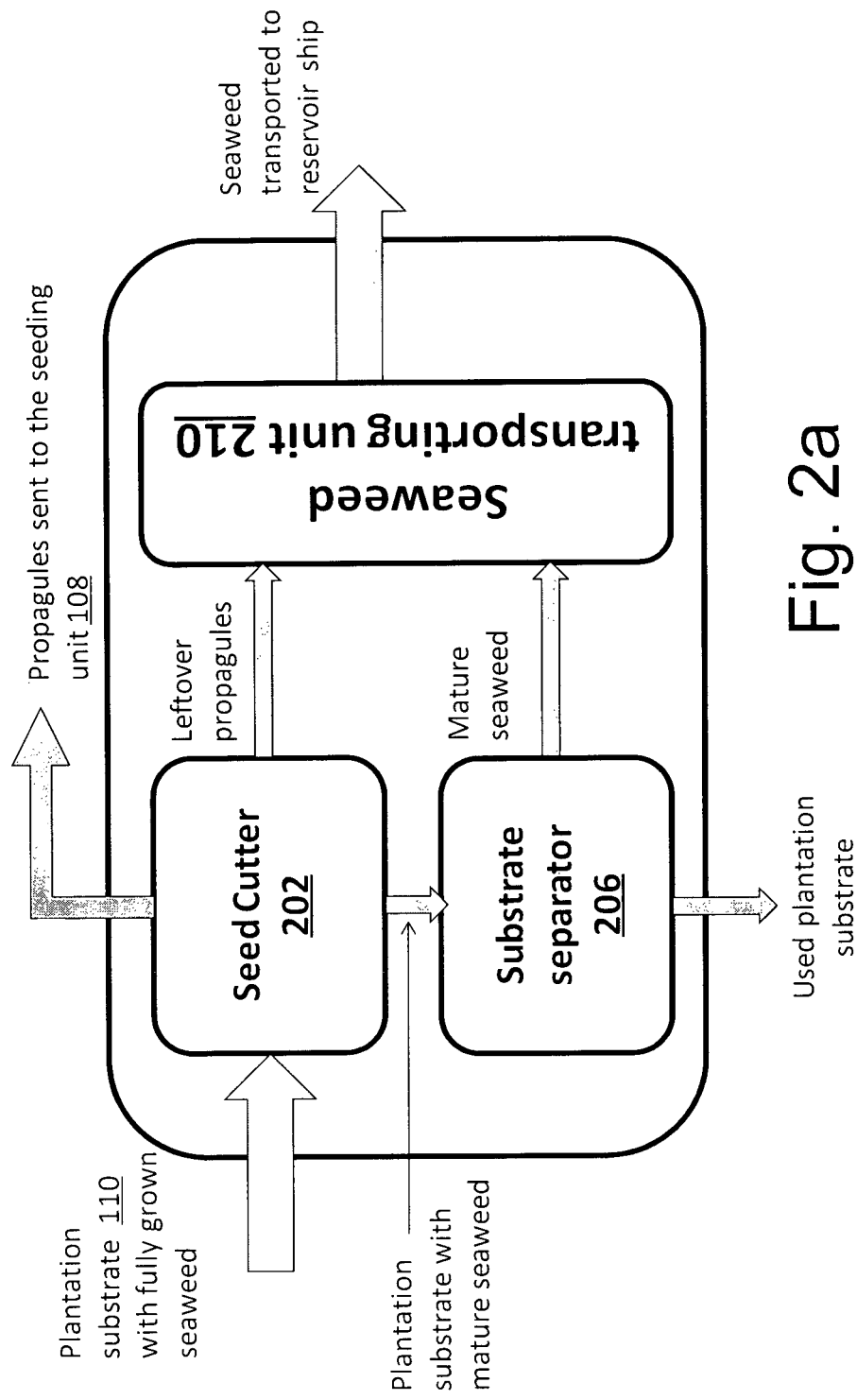
FIG. 2a illustrates a schematic of a seaweed farm operating assembly of the seaweed farming system, in accordance with an embodiment of the present subject matter.
Figure 2B:
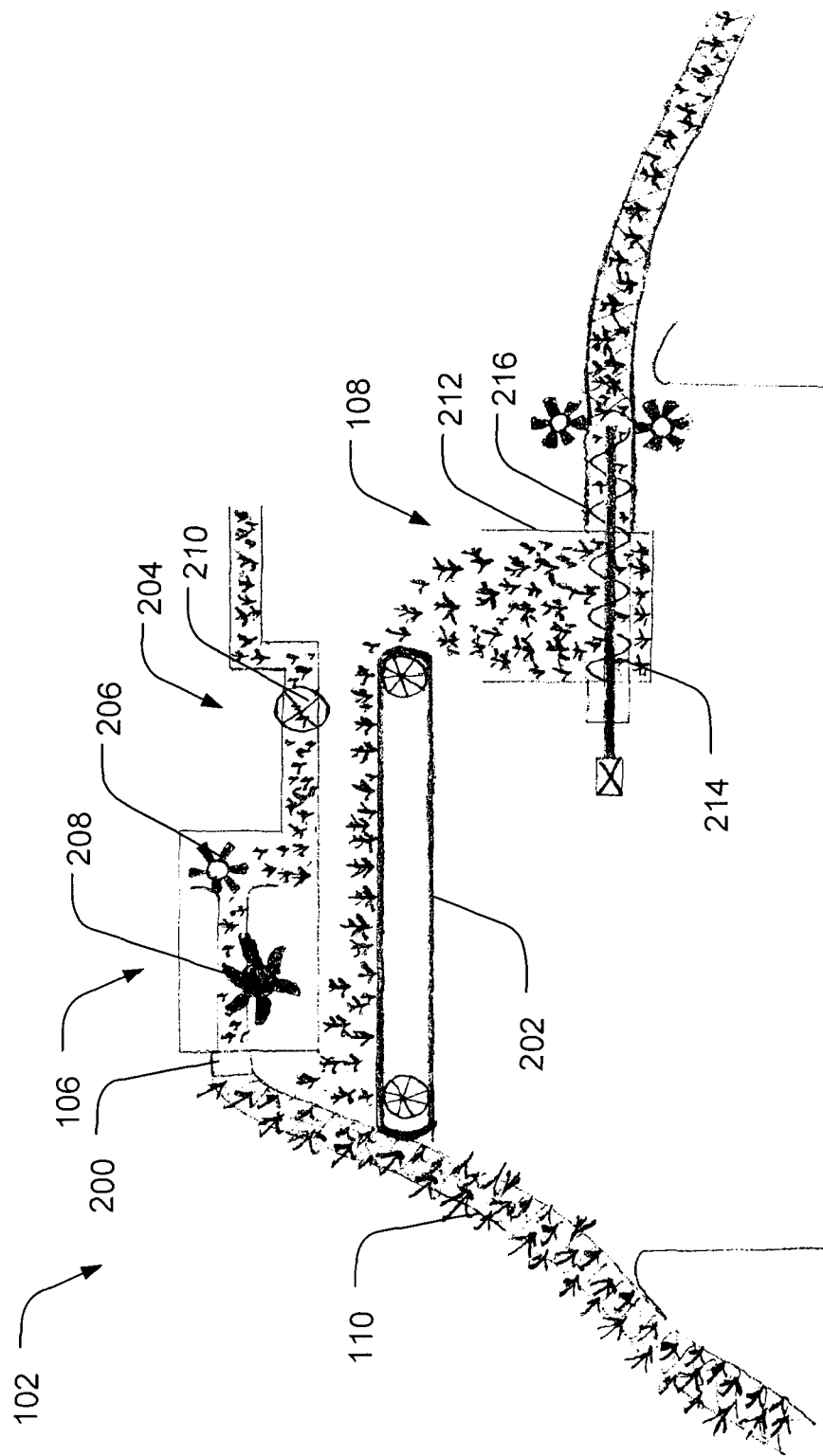
FIG. 2b illustrates a seaweed farm operating assembly of the seaweed farming system, in accordance with an embodiment of the present subject matter.

FIGS. 2a and 2b illustrate the seaweed farm operating assembly 102 of the seaweed farming system 100, according to an embodiment of the present subject matter. As mentioned previously, the seaweed farm operating assembly 102 includes the harvesting unit 106 for harvesting the mature seaweed to separate the propagules or the vegetative portion of the seaweed from the remaining seaweed, and the seeding unit 108 to sow a portion of the propagules in fresh plantation substrate. The plantation substrate 110 can be formed of nets or ropes, for instance, made of synthetic material. In an example, the plantation substrate 110 can be provided in a hollow tubular mesh form and made of a synthetic material, such as plastic.

Figure 3:
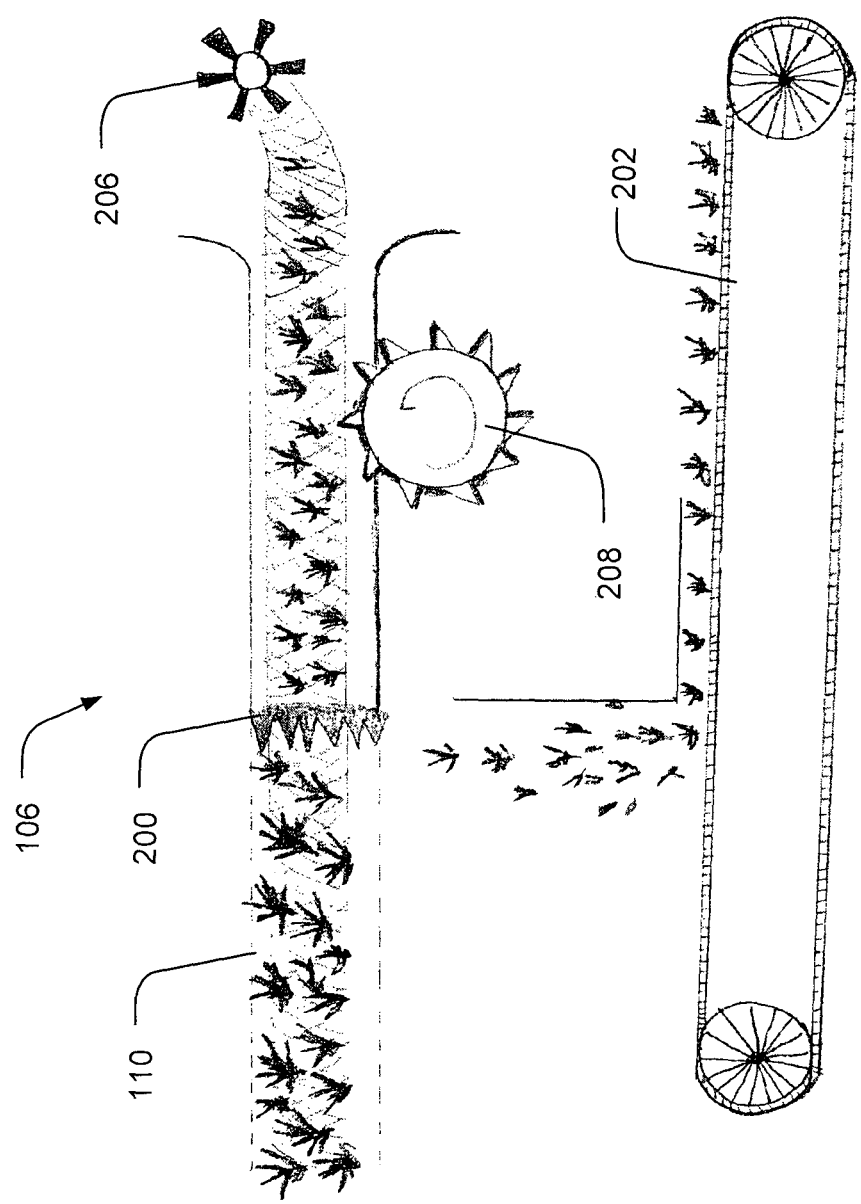
FIG. 3 illustrates a harvesting unit of the seaweed farm operating assembly, in accordance with an embodiment of the present subject matter.

Further, for effective operation, the harvesting unit 106 can be adapted to shear the vegetative portion of the mature seaweed. The harvesting unit 106 is further shown in FIG. 3. For the sake of brevity, the description of FIG. 2a, FIG. 2b, and FIG. 3, with reference to the harvesting unit 106 is provided in conjunction. Accordingly, in an implementation, the harvesting unit 106 can include a seed cutter 200 for severing the propagules from the seaweed. In an example, in which the plantation substrate 110 is in tubular form, the seed cutter 200 can be a rotary cutter. In said example, a blade of the rotary cutter can be rotatable about a central longitudinal axis. Further, to effect operation of harvesting the seaweed, the harvesting unit 106 can include a substrate puller (not shown) to draw the plantation substrate 110 towards the seed cutter 200. In an example, the substrate puller can be a roller, actuated by a motor, such as a stepper motor or a servo motor controllable by a controlling device to regulate the manner of drawing the plantation substrate 110 towards the seed cutter 200.

During operation, the substrate puller pulls the seaweed to be harvested towards the seed cutter 200 and the seed cutter 200 shears the propagules from the mature seaweed. Further, the harvesting unit 106 can include a conveyor 202 which receives the sheared propagules from the seed cutter 200 and carries the propagules to the seeding unit 108. In an example, the conveyor 202 can be a conveying belt actuated by actuators, such as motors, and controlled by the controlling device, to regulate transporting of the propagules to the seeding unit 108. In another example, the conveyor 202 can be a screw conveyor or any other type of conveying, mechanism.

In another case, the propagules may fall directly in the seeding unit 108 or conveyed along the boat by conventional methods if needed. For instance, the seaweed farming system 100 can be provided with a seeding trough right beneath the seed cutter 200, and in such a case, the conveyor 202 may not be required to transport the propagules from one point to other.

Further, as mentioned previously, in addition to separating the propagules from the seaweed, the harvesting unit 106 can also transport the harvest, i.e., the mature seaweed, to a reservoir. In few cases, a certain portion of the propagules can also be transported to the reservoir. For instance, in certain cases, the amount of propagules obtained from harvesting the seaweed is almost two to three times more than the amount of propagules to be seeded in the plantation substrates. Hence, in such a case, the excess propagules are processed, say chopped, and transported to the reservoir on the ship along with the mature seaweeds. According to an aspect, before transporting, the harvesting unit 106 can process the harvest, for example, for easily transporting the harvest. For instance, the harvesting unit 106 can have a unit, called the seaweed transportation unit, to convert the harvested seaweed into finely chopped pieces, mix the same with water, and then pump the same to the reservoir.

Accordingly, in an implementation, the harvesting unit 106 can include a harvest processor 204 for processing the harvest received from the seed cutter 200. In an implementation, the harvest processor 204 can include a substrate separator 206 and a harvest disintegrator (not shown). The substrate separator 206 can be provided to separate and detach the plantation substrate 110 from the seaweed. Further, in certain cases, for instances, in which the seaweed is entangled in the plantation substrate 110, such as a net, the harvesting unit 106 can be provided with a substrate cutter 208 to assist the substrate separator 206 in separating the seaweed from the plantation substrate 110.

In an example, before the plantation substrate 110 passes through the substrate separator 206, the substrate puller can draw the plantation substrate 110 through the substrate cutter 208. Accordingly, in said example, the substrate cutter 208 can cut the plantation substrate 110 to facilitate the substrate separator 206 in completely detaching the seaweed from the plantation substrate 110.

In addition, as mentioned earlier, the seaweed conveying unit may have a harvest disintegrator which can process the seaweed for transporting to the reservoir. In an example, the harvest disintegrator can break the harvest into pulp and mix the pulp with water. In another example, the harvest disintegrator can shred the harvest into smaller pieces for easily transporting the harvest. Further, the harvest disintegrator can provide the processed seaweed to a transporting unit 210 for carrying the harvest to the reservoir, say located on a separate ship or boat, while the vehicle is in operation. In an example, the transporting unit 210 can be a pumping unit to pump the mixture of pulp of seaweed and water to the reservoir.

Coming back to the seeding unit 108 of the seaweed farm operating assembly 102, a seed trough 212 of the seeding unit 108 can receive the propagules from the seed cutter 200 of the harvesting unit 106. In an example, the seed trough 212 can serve as a temporary storage for the propagule. Further, in an implementation, the seeding unit 108 can include a seed feeder 214 for providing the propagules to fresh plantation substrate for attaching the propagules to the fresh substrate. In an example, the seed feeder 214 can be provided in the seed trough 212, such that the seed feeder 214 can provide the propagules from the inside the seed trough 212 for seeding.

Further, in order to sow the propagules in the fresh plantation substrate, the seeding unit 108 includes a substrate cartridge 216, for instance, tube mesh rolled over a cylindrical cartridge, for mounting the fresh plantation substrate, and a fresh substrate puller (not shown) for pulling the fresh plantation substrate from the substrate cartridge 216. In an implementation, the operation of the fresh substrate puller and the seed feeder 214 is so coordinated that the seed feeder 214 can provide the propagules to the fresh plantation substrate and the fresh substrate puller can continuously draw the plantation substrate with the attached propagules away from the seeding unit 108 for deployment in water.

Figures 2, 4A:
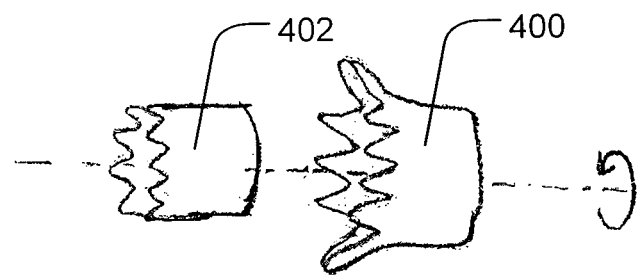

FIG. 4a-1 and FIG. 4a-2 illustrate the seed cutter 200 of the harvesting unit 106, in accordance with an implementation of the present subject matter. FIG. 4a-1 illustrates a front view of the seed cutter 200 and FIG. 4a-2 illustrates an exploded view of the seed cutter 200, according to said implementation. For the sake of brevity, FIG. 4a-1 and FIG. 4a-2 are explained in conjunction.

In an embodiment, as mentioned previously, the seed cutter 200 is a rotary type seed cutter, for example, for cutting the propagules from seaweed growing in tubular plantation substrates 110. In an implementation, the seed cutter 200 includes a first blade 400 and a second blade 402. The first blade 400 and the second blade 402 can be disposed concentrically with respect to each other. In said example, both, the first blade 400 and the second blade 402 can be provided with a cutting edge for shearing the vegetative portion or the propagules from the mature seaweed. The cutting edge can be the edge which directly comes in contact with the mature seaweed for harvesting.

Further, in one case, the cutting edge of the first blade 400 and the second blade 402 can be provided with a jagged edge or teeth for effectively cutting. The first blade 400 and the second blade 402 can be provided with relative rotary motion with respect to each other about a common central longitudinal axis. For instance, the first blade 400 can be stationary and the second blade 402 can rotate. In another case, both the first blade 400 and the second blade 402 can rotate in opposite directions of rotation. With the relative rotation between the first blade 400 and the second blade 402, each pair of cooperating teeth at the cutting edges of the two blades 400 and 402 can perform the cutting operation in a similar manner as a pair of scissors. The pair of cooperating teeth can be understood as the pair out of which one tooth is provided on the first blade 400 and the other tooth provided on the second blade 402, which perform an action similar to that of the scissors during the relative rotation between the two blades. As would be understood, each tooth on one blade 400, 402 cooperates with each tooth on the other blade 400, 402. In addition, in an example, the first blade 400 or the second blade 402 or both can be formed of separate blade elements arranged together cylindrically to form the cylindrical blades 400, 402.

Figures 1, 4B:
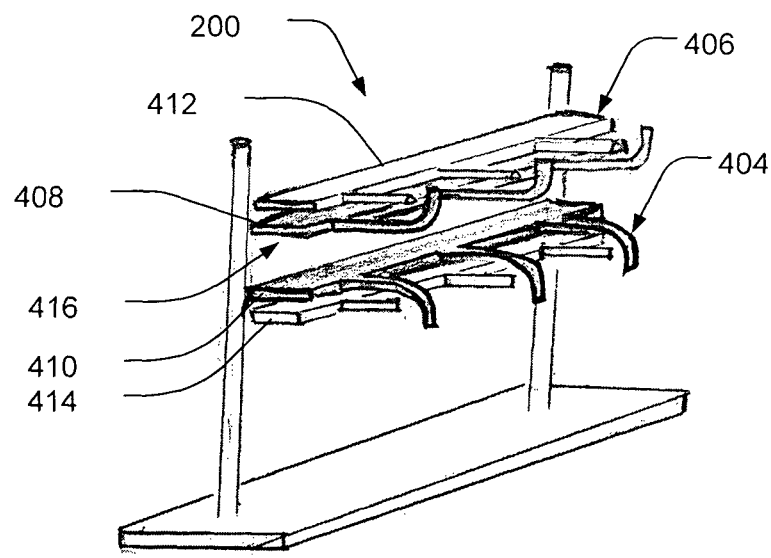
Figures 2, 4B:
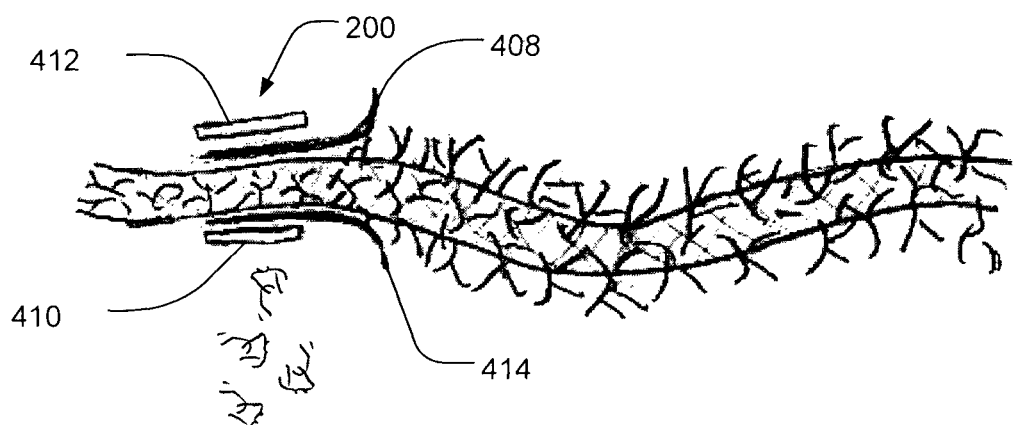

FIGS. 4b-1 and 4b-2 illustrate the seed cutter 200, in accordance with another implementation of the present subject matter. In said implementation, the seed cutter 200 can be a comb-cutter having a first set of blades 404 and a second set of blades 406. In an example, the first set of blades 404 and the second set of blades 406 can be formed as comb-type, i.e., as having a plurality of substantially flat blades with surfaces parallel to each and having cutting teeth formed along the surface at a cutting edge. The cutting edges can be understood as those edges which directly come in contact with the seaweed crop for harvesting. The surface of the first set of blades 404 can be provided as being abutted against a surface of the second set of blades 406, and the first set of blades 404 can be movable with reference to the second set of blades 406 along the abutting surfaces. In said implementation, the two sets of blades 404 and 406 can be provided with a relative motion between the two to cause the cutting edges to function as shearing edges to cut the propagules from the mature seaweed.

As shown as an example in FIGS. 4b-1 and 4b-2, the first set of blades 404 can be static with reference to the second set of blades 406 and can include two blades, namely, a first static blade 408 and a second static blade 410. Similarly, the second set of blades 406 can be moving with reference to the first set of blades 404 and can include a first moving blade 412 and a second moving blade 414. The first static blade 408 and the first moving blade 412 can be provided in each other's vicinity with the surfaces of the two blades 408 and 412 abutting against each other. Further, in a similar manner, the second static blade 410 and the second moving blade 414 can be provided in each other's vicinity with the surfaces of the two blades 410 and 414 abutting against each other. During operation, in an example, the first moving blade 412 and the second moving blade 414 can move with reference to the first static blade 408 and the second static blade 410, respectively. As the seaweed passes through the gap 416 along a common axis of symmetry of the two sets of blades 404 and 406, the propagules are cut from the mature seaweed.

FIG. 4c illustrates the seed cutter 200, according to one other implementation of the present subject matter. In said implementation, the seed cutter 200 is a rotary cutter having a single blade 418. In such a case, the single blade 418 may be static or may rotate about a central longitudinal axis, and the cutting edge of the single blade 418 shears the propagules from the mature seaweed.

During the operation of the seed cutter 200, in the above described implementations, the substrate puller can draw the plantation substrate 110, with the seaweed to be harvested, through the rotary-type cutter, along an axis of rotation of the rotary-type cutter. In an example, as explained above, the axis of rotation of the seed cutter 200 can be the central longitudinal axis of the blade(s) 402, 404, 418

Figure 5:
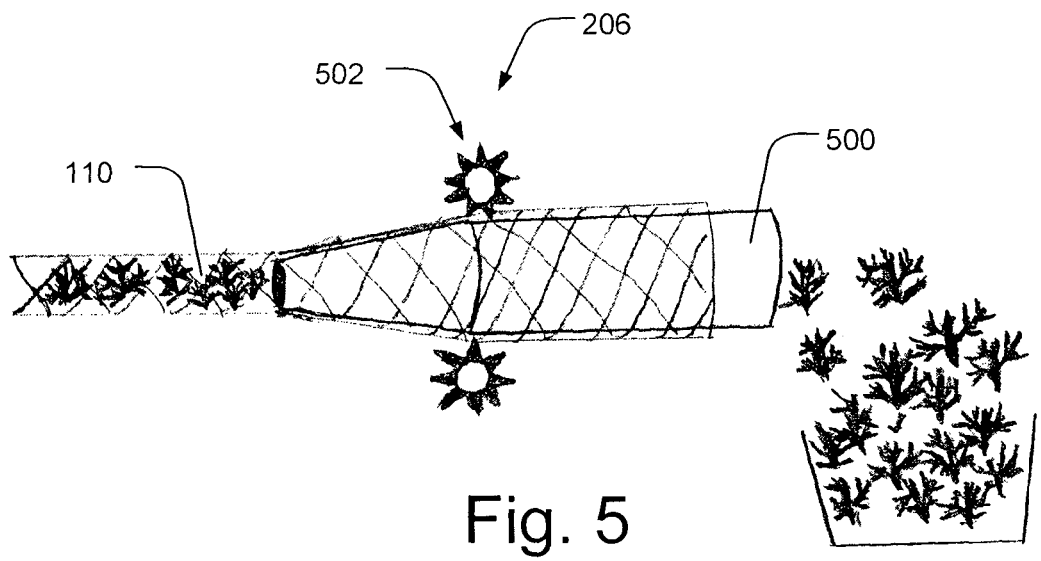
FIG. 5 illustrates a substrate separator of the harvesting unit, in accordance with an embodiment of the present subject matter.

FIG. 5 illustrates the substrate separator 206 of the harvesting unit 106, according to an implementation of the present subject matter. In said implementation, the substrate separator 206 is provided in the form of a hollow tubular structure 500, along which the substrate puller 502 draws the plantation substrate along with the seaweed to be harvested. As shown, as the substrate puller 502 draws the plantation substrate 110, the plantation substrate 110 is pulled along an outer surface of the hollow tubular structure 500 of the substrate separator 206 and the harvest enters the cavity of the hollow tube. Subsequently, the harvested seaweed can be provided to the conveyor 202, and the plantation substrate 110 can be disposed off.

Figure 6:
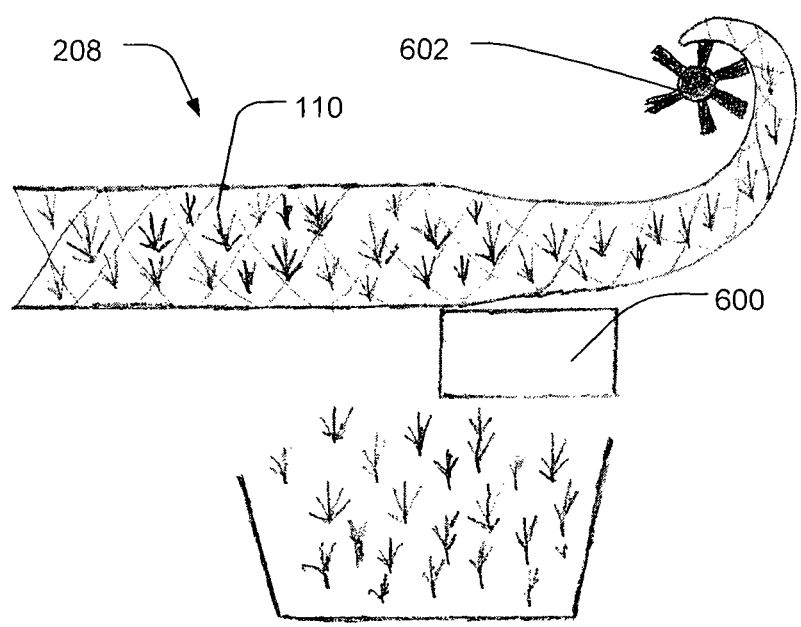
FIG. 6 illustrates a substrate cutter of the harvesting unit, in accordance with an embodiment of the present subject matter.

FIG. 6 illustrates the substrate separator with a substrate cutter 208, in accordance with an implementation of the present subject matter. As mentioned previously, the substrate cutter 208 is provided to facilitate the separation of the harvested seaweed from the plantation substrate 110 by the substrate separator 206. In said implementation, the substrate cutter 208 can be a blade 600 having its cutting edge aligned in a direction opposite to the direction of pulling the plantation substrate 110. Therefore, as the substrate puller 502 pulls the plantation substrate 110 against the blade 600, the cutting edge of the blade 600 can split the plantation substrate 110 and hence separate the mature seaweed from the plantation substrate.

In another implementation, the substrate cutter 208 can be a rotary cutter with a disc-shaped blade capable of rotating about a stationary axis. In said implementation, the substrate puller 502 can draw the plantation substrate 110 against the rotating cutting edge of the disc-shaped blade. In an example, such a rotary cutter can be deployed in cases where the plantation substrate 110 is strong and may not be easily cut by a stationary blade, as described in the previous implementation.

Further, the harvesting unit 106 can include a substrate collector 602 in combination with the substrate cutter 208 to collect the substrate from which the seaweed has been separated. In an example, the substrate collector 602 can be a roller which can rotate to roll and collect the substrate and which can subsequently be disposed, reused, or recycled. In an example, the substrate collector 602 can collect the intact substrate; whereas in another example, the substrate collector 602 can collect the split substrate which has been cut by the substrate cutter 208.

Figure 7A:
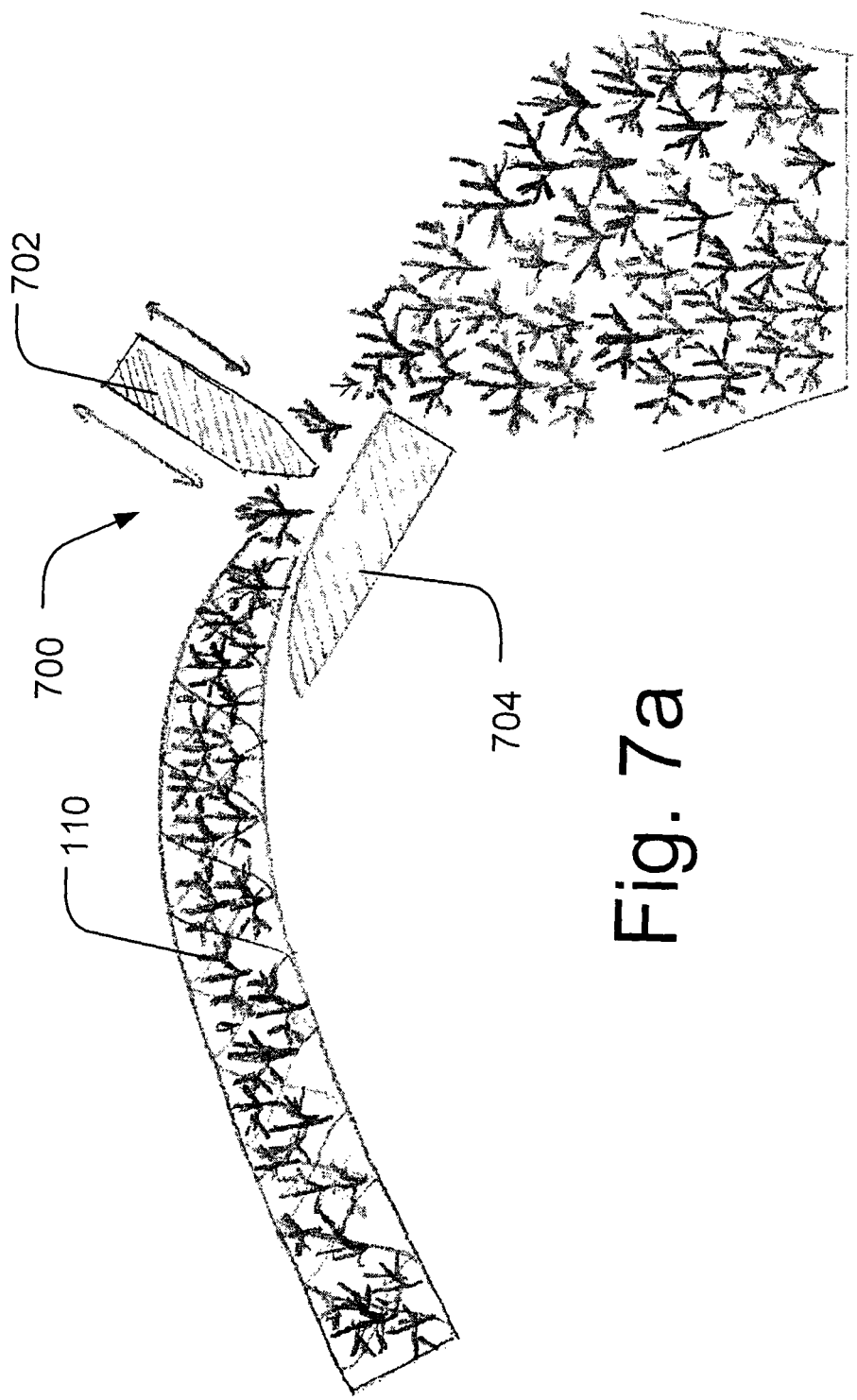
FIG. 7a illustrates a harvest disintegrator of the harvesting unit, in accordance with an embodiment of the present subject matter.
Figure 7B:
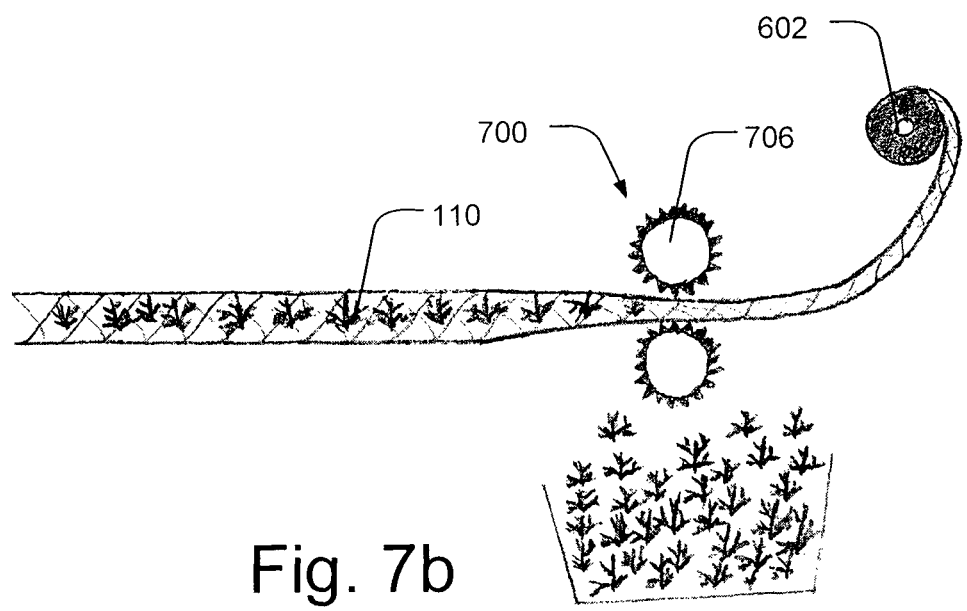
FIGS. 7b and 7c illustrate the harvest disintegrator of the harvesting unit, in accordance with another embodiment of the present subject matter.
Figure 7C:
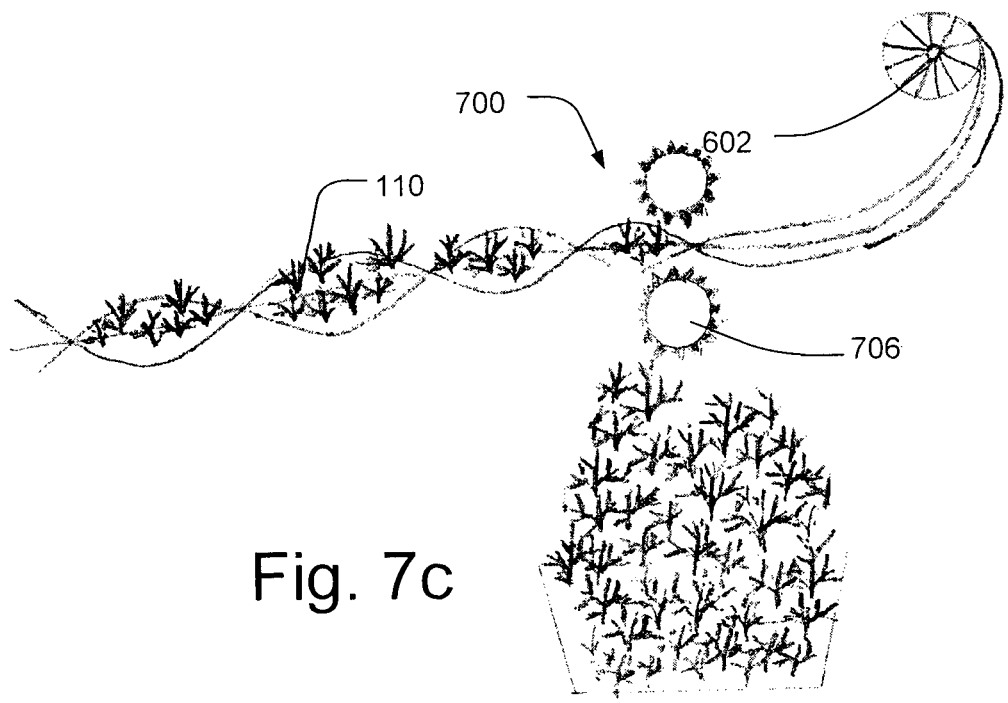

FIG. 7a, FIG. 7b, and FIG. 7c illustrate various implementations of a harvest disintegrator 700 in accordance with the present subject matter. In FIG. 7a, the harvest disintegrator 700 is shown as having one of more chopper blades 702. As explained above, before the transporting unit 210 of the harvesting unit 106 can transport the harvest to a reservoir, the harvest disintegrator 700 breaks down the harvest for ease of transportation. In one case, the harvest disintegrator 700 can disintegrate the substrate, made of say, biodegradable materials, along with the seaweed. In another example, the harvest disintegrator 700 can include a pair of rollers (not shown) or any other crushing device which disintegrates the seaweed into pieces small enough to fall out of the substrate, while the substrate remains intact. In said implementation, the harvest disintegrator 700 can include a conveyor (not shown) which carries the seaweed from the substrate separator 206 to the harvest disintegrator 700. The chopper blade 702 can be actuated, by way of an actuating mechanism controlled by a controlling device, to cut down the seaweed. In an example, the chopper blade 702 can be actuable in a direction substantially perpendicular to a platform 704, say of the conveyor, which carries the seaweed. The chopped mixture of seaweeds and plantation substrate may be pumped to the reservoir boat via the seaweed conveying unit. This mixture may later be separated in settling tanks filled with water where the seaweed pieces are heavier than water and sink, and the pieces of the vegetative portion or the propagules are buoyant and float in water. In case the harvest disintegrator does not bring down the size of the seaweed to the required limit, the pieces can be chopped down to the required size in the seaweed conveying unit in an additional step, right before the conveying.

FIGS. 7b and 7c illustrate another implementation of the harvest disintegrator 700. FIG. 7b illustrates the case when the plantation substrate 110 is provided as a tubular mesh, whereas FIG. 7c illustrates the case when the plantation substrate 110 is in the form of cables or ropes; however, the implementation of the harvest disintegrator 700 is the same in both the cases. Accordingly, in said implementation, the harvest disintegrator 700 is provided as crushing rollers 706. In an example, as shown in FIG. 7b, the harvesting disintegrator 700 can include a pair of crushing rollers 706. In other examples, however, the harvesting disintegrator 700 can include more than one pair of crushing rollers 706. During operation, the seaweed is carried to the crushing rollers 706 and is pulverized by the crushing rollers. These small pieces fall through the plantation substrate and can be collected separately. The plantation substrate is rolled up separately on the substrate roller. Alternatively, instead of rolling up the plantation substrate, conventional methods of storage may be employed on the seaweed farm operating assembly to store the substrate.

Figure 8A:
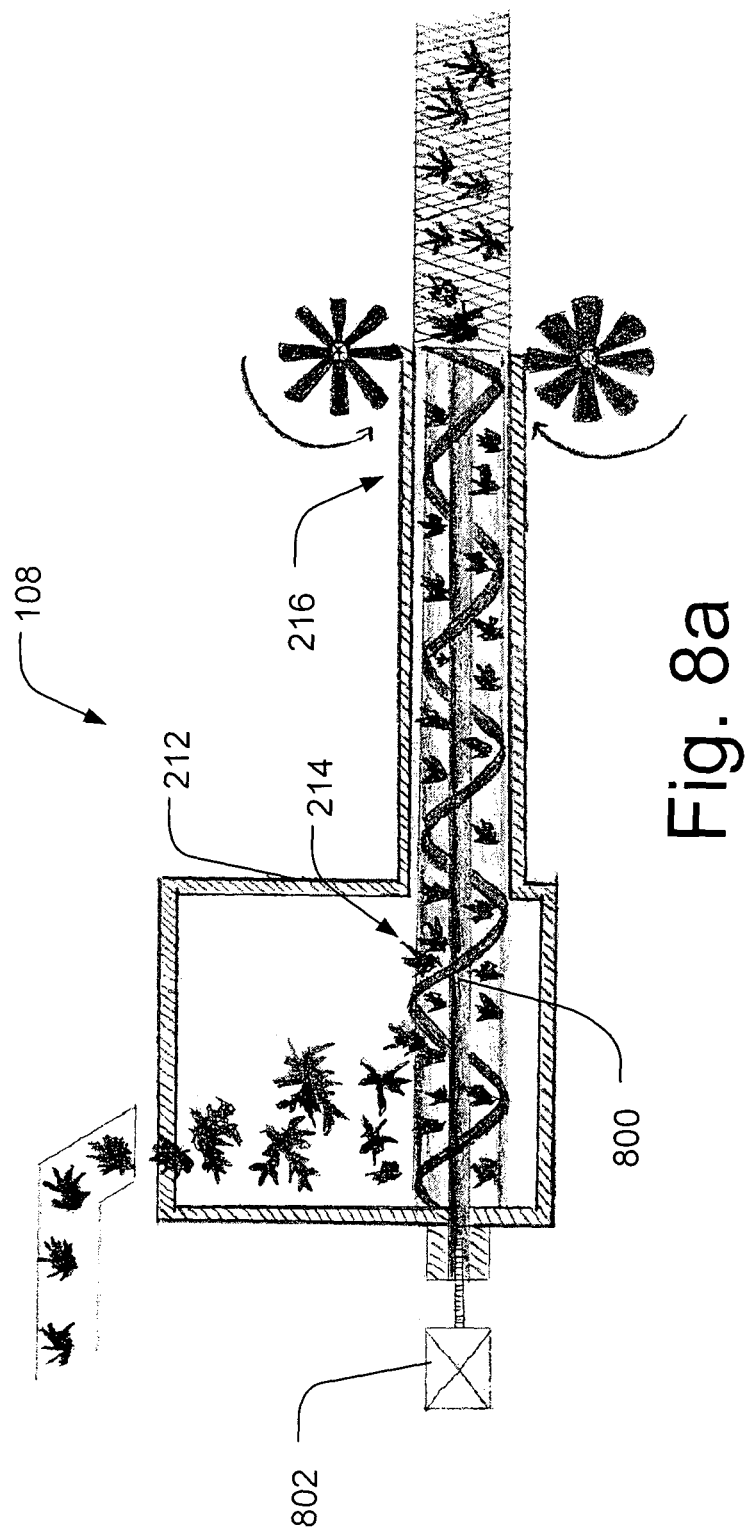
FIG. 8a illustrates a seeding unit of the seaweed farm operating assembly, in accordance with an embodiment of the present subject matter.

FIG. 8a illustrates the seeding unit 108 of the seaweed farm operating assembly 102, in accordance with an implementation of the present subject matter. In an example, FIG. 8a illustrates the seed feeder 214 of the seeding unit 108, in accordance with said implementation of the present subject matter. As explained previously, during operation, the seed trough 212 receives the propagules from the harvesting unit 106 and the seed feeder 214 provides the propagules to the fresh plantation substrate for attaching thereto. Subsequently, the seeded plantation substrate is deployed in water for cultivation of the seaweed.

In the implementation shown in FIG. 8a, the seed feeder 214 can be a screw-type feeder 800 with helical threads provided on an outer surface of the screw-type feeder 800 and the plantation substrate used is in the form of a tubular mesh. In said implementation, the screw-type feeder 800 can be operable by an actuator 802, such as a stepper motor or a servo motor. In an example, the actuator 802 can be controlled by a controlling device to regulate the operation of the screw-type feeder 800. During operation, the actuator 802 can rotate the screw-type feeder 800, such that the helical threads move linearly along a length of the screw-type feeder 800 in the direction of the fresh plantation substrate, mounted on the substrate cartridge 216. Accordingly, the linearly moving threads of the screw-type feeder 800 can carry the propagules towards the fresh plantation substrate for seeding. As the plantation substrate is filled with propagules, it is pulled outwards so that a new length of plantation substrate can be filled with propagules.

Figure 8B:
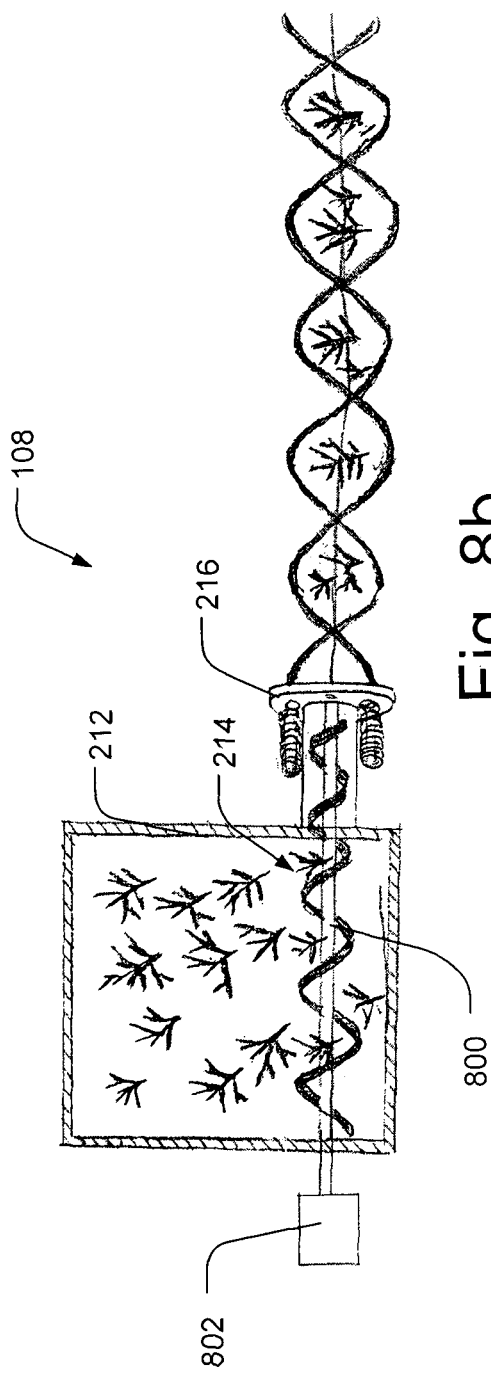
FIG. 8b illustrates the seeding unit of the seaweed farm operating assembly, in accordance with another embodiment of the present subject matter.
Figures 1, 8B:
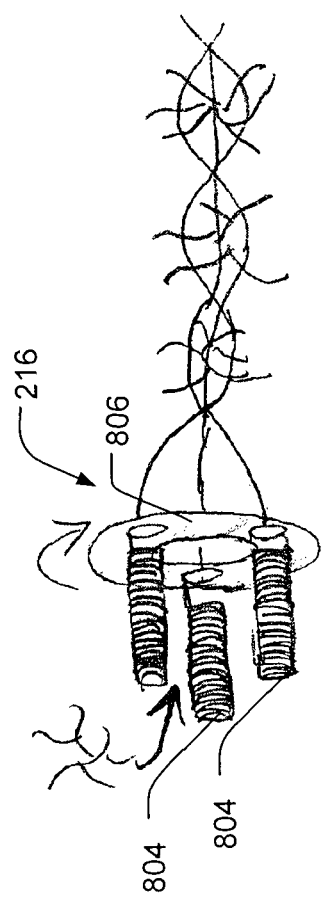

Further FIGS. 8b and 8b-1 illustrate an example of the implementation of the seeding unit 108, as described with reference to FIG. 8a. For the sake of brevity, FIGS. 8b and 8b-1 are described in conjunction. In said implementation, the plantation substrate used is in the form of cables or ropes.

Accordingly, the substrate cartridge 216 in this case includes a plurality of reels 804 of the fresh plantation substrate, the reels 804 being formed of a shaft having the fresh plantation substrate mounted thereon. Further, the plurality of reels 804 can be connected to a disc 806 rotatable about a stationary axis. During operation, as the screw-type feeder 800 provides the propagules, the fresh substrate puller pulls the fresh plantation substrate from the reels 804. In addition, the rotational motion of the disc entangles the cables from the plurality of reels and the propagules are effectively fixed to the plantation substrate. The entanglement of the cables provides for forming a good quality plantation substrate from the cables, which can hold the propagules and prevents the loss of propagules.

Figure 9A:
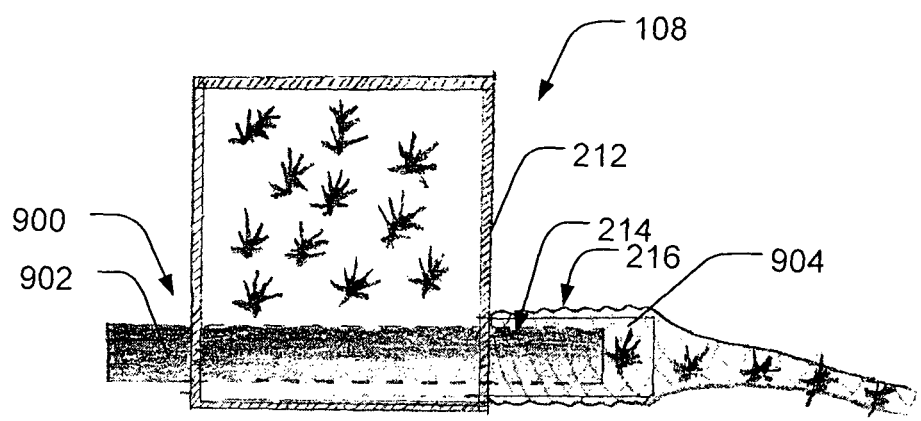
FIGS. 9a and 9b illustrate a seed feeder of the seeding unit, in accordance with an embodiment of the present subject matter.
Figure 9B:
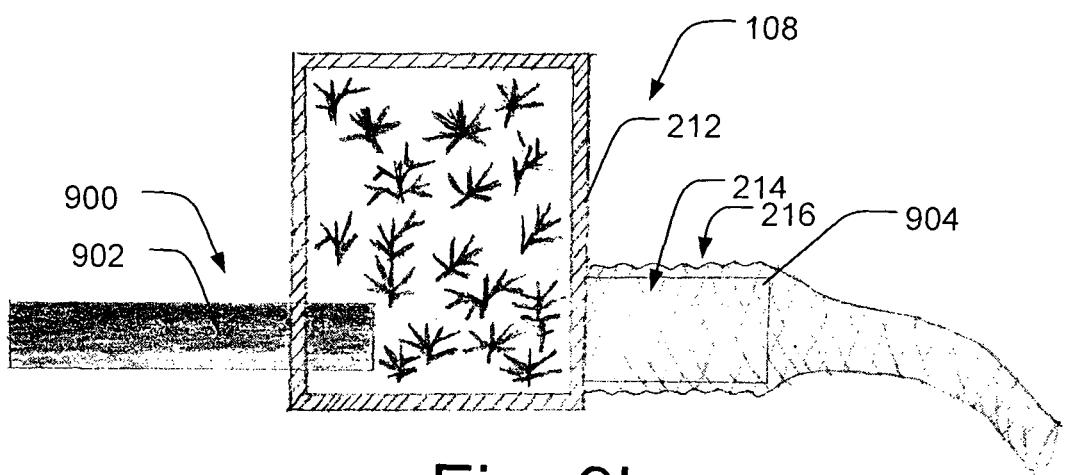

FIGS. 9a and 9b illustrate another implementation of the seed feeder 214 of the seeding unit 108, in accordance with the present subject matter. In said implementation, the seed feeder 214 can be a piston-type feeder 900, and can include a piston 902 movably disposed in a cylinder 904 of the piston-type feeder 900. As explained with reference to the previous implementation, the piston-type feeder 900 can also be operable by an actuator (not shown). In an example, the actuator can be a motor and can be connected to the piston 902 through one or more linkages to convert the rotary motion of the motor into reciprocatory motion of the piston 902. The piston 902 reciprocates in the cylinder 904 to carry the propagules from the seed trough 212 to the fresh plantation substrate.

Further, in an example, FIGS. 9a and 9b show the piston-type feeder 900 in two extreme positions, during operation. FIG. 9a illustrates the piston 902 of the piston-type feeder 900 in the position in which it is proximal with respect to the substrate cartridge 216 and has pushed the propagules into the fresh plantation substrate. On the other hand, FIG. 9b illustrates the position of the piston 902 in the cylinder 904 when the piston 902 is retracted to be distal from the substrate cartridge 216. In this position, the propagules are allowed to settle down in line of motion of the piston 902, so that when the piston reciprocates, the propagules are pushed towards the substrate cartridge 216. The plantation substrate can either be pushed out along with the propagules during every stroke, or its motion can be assisted with the help of substrate pullers which can pull the substrate out in a predefined pattern which can be controlled via a controlling unit.

Figure 10:
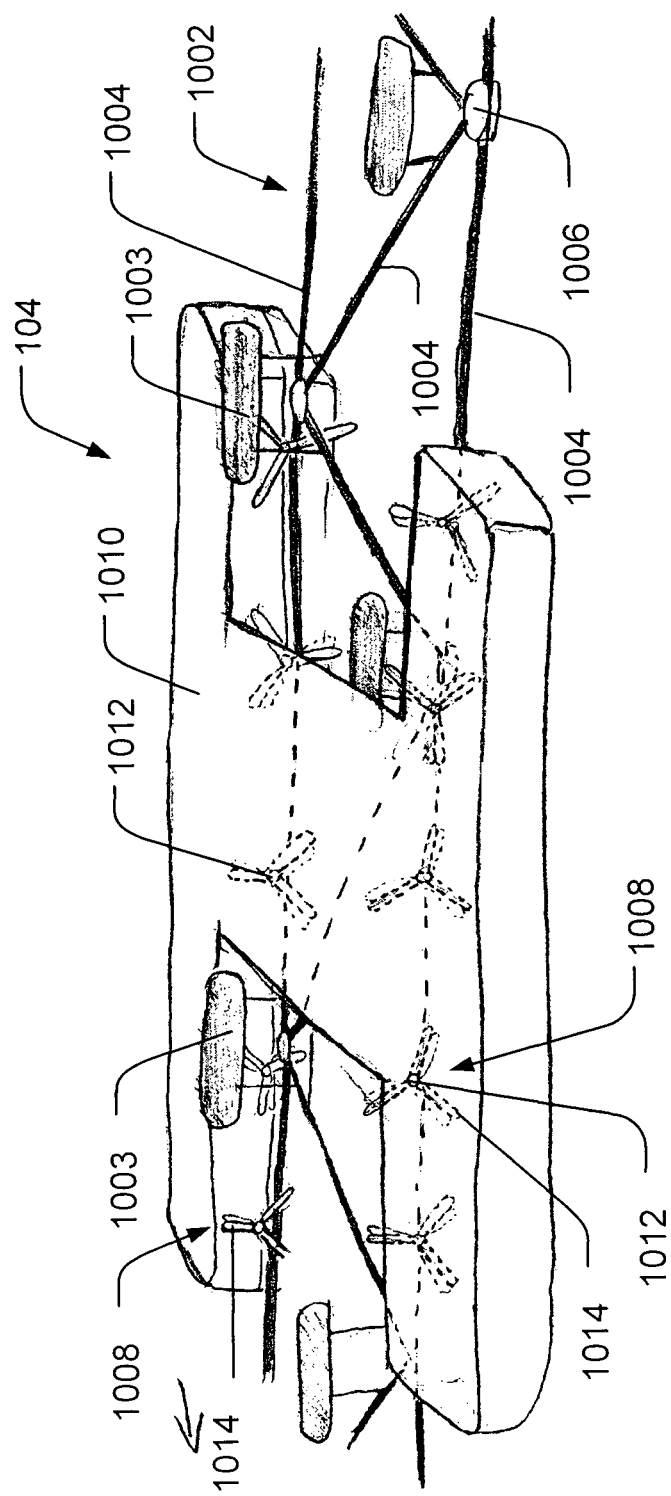
FIG. 10 illustrates a guiding apparatus of the seaweed farming system and a propulsion mechanism of the seaweed farm operating assembly, in accordance with an embodiment of the present subject matter.

FIG. 10 illustrates the guiding apparatus 104 of the seaweed farming system 100 and the propulsion mechanism 1008 of the seaweed farm operating assembly 102, in accordance with an embodiment of the present subject matter. As explained earlier, the guiding apparatus 104 and the propulsion mechanism 1008 cooperate together for the movement and propulsion of the seaweed farm operating assembly 102 over the surface of water for cultivating and harvesting the seaweed. In another implementation, the guiding and propulsion mechanism can be provided as a single unit and can include a platform for mounting the seaweed farm operating assembly 102. In such a case, the propulsion mechanism 1008 is coupled to the platform for propelling the seaweed farm operating assembly 102 on the guiding apparatus 104.

In said embodiment, the guiding apparatus 104 includes a floating frame 1002 which forms and serves as the guide rail for disposing the seaweed farm operating assembly 102 thereon. In an implementation, the floating frame 1002 can be a flexible floating structure which can be tied to one or more anchors to stabilize the position of the floating frame 1002 and to prevent the floating frame 1002 to drift, say in case the Seaweed Farming system is deployed in a large water body, such as an ocean or sea. In addition, to keep the floating frame 1002 afloat, the floating frame 1002 can be coupled with a plurality of floats 1003. Accordingly, in an example, the floating frame 1002 can be formed of a plurality of longitudinal elements 1004 connected to each other to form a set of guide rails for the seaweed farm operating assembly 102 to tread on. In an example, the plurality of longitudinal elements 1004 can be formed as rigid structures. In another example, the plurality of longitudinal elements 1004 can be formed as non-rigid structures, say formed of ropes.

Further, in order to impart flexibility to the floating frame 1002, according to an aspect, each longitudinal element 1004 can be coupled to the adjacent longitudinal element 1004 by a flexible coupling 1006. In an example, the flexible coupling 1006 can be a universal joint which provides six degrees of freedom to each longitudinal element 1004 about the flexible coupling 1006. In another example, the flexible coupling 1006 can be a ball and socket joint.

As mentioned previously, according to said embodiment, the seaweed farm operating assembly 102 can be provided with the propulsion mechanism 1008 to propel the seaweed farm operating assembly 102 on the floating frame 1002. Accordingly, the propulsion mechanism 1008 can cooperate with the guiding rails formed by the floating frame 1002 for the movement of the seaweed farm operating assembly 102. In an implementation, the seaweed farm operating assembly 102 is mounted on a platform 1010 and the propulsion mechanism 1008 can be coupled directly to the platform 1010.

In an implementation, the propulsion mechanism 1008 is a wheel-type propulsion mechanism. In said implementation, the propulsion mechanism 1008 includes a plurality of guide wheels 1012 and each guide wheel 1012 is coupled to a drive unit (not shown) to provide a drive to the plurality of guide wheels 1012. In an example, each guide wheel 1012 can be provided with a plurality of spokes 1014, say on rims of the guide wheel 1012. The spokes 1014 can prevent the seaweed farm operating assembly 102 from dismounting the floating frame 1002. In addition, the spokes interact with the frame at the junction points of the guiding member helping the system to move ahead.

Figure 11A:
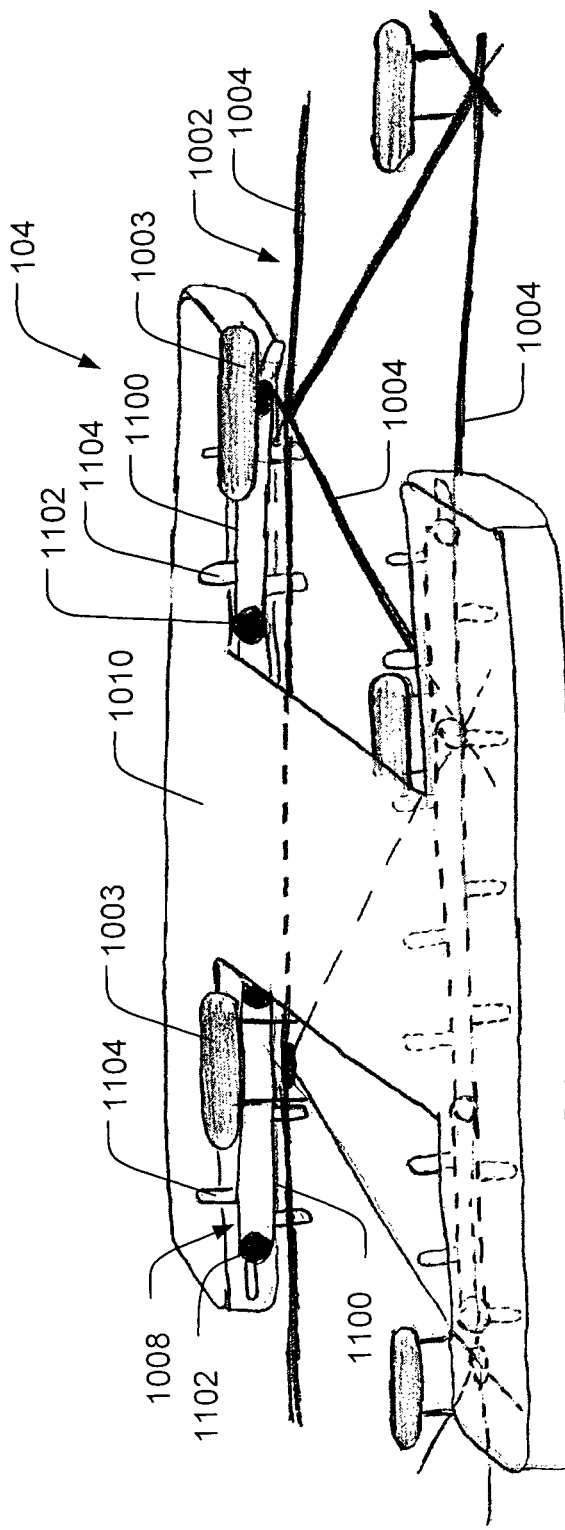

FIG. 11a and FIG. 11b illustrate another implementation of the propulsion mechanism 1008 of the seaweed farm operating assembly 102. As seen, FIG. 11a illustrates a perspective view of the guiding apparatus 104 and the propulsion mechanism 1008 and FIG. 11b illustrates a side view of the guiding apparatus 104 and the propulsion mechanism 1008. For the sake of brevity, the description of FIG. 11a and FIG. 11b is provided in conjunction.

According to the implementation shown in FIGS. 11a and 11b, the propulsion mechanism 1008 is a belt type propulsion mechanism. In said implementation, the propulsion mechanism 1008 can include a plurality of drive belts 1100 which cooperate with the guide rails of the floating frame 1002 to propel the seaweed farm operating assembly 102. In an implementation, each drive belt 1100 can be provided with a plurality of pulleys 1102 which are coupled to a drive mechanism to drive the propulsion mechanism 1008, say the pulleys 1102 in this case. The pulleys 1102 can, in turn, actuate the drive belts 1100 to propel the seaweed farm operating assembly 102. As mentioned previously, the drive mechanism can be coupled to a controlling device to regulate the operation of the drive belts 1100. In an example, in both the above implementations, the drive mechanism for driving the guide wheels 1012 or the drive belts 1100 can be a mechanical drive, say an internal combustion engine, or an electric drive, say a motor. In case the driving mechanism is the internal combustion engine, the controlling device can be an engine control unit, whereas in case the driving mechanism is a motor, the controlling device can be programmable logic controller.

Further, in said implementation, each drive belt 1100 can have a plurality of extension elements 1104 which extend in a substantially perpendicular direction with respect to the mating surface of the drive belt 1100. The extension elements 1104 can prevent the seaweed farm operating assembly 102 from dismounting the floating frame 1002, and can also interact with the frame at the junction points of the truss helping the system to move ahead as the belt keeps moving.

Figure 12:
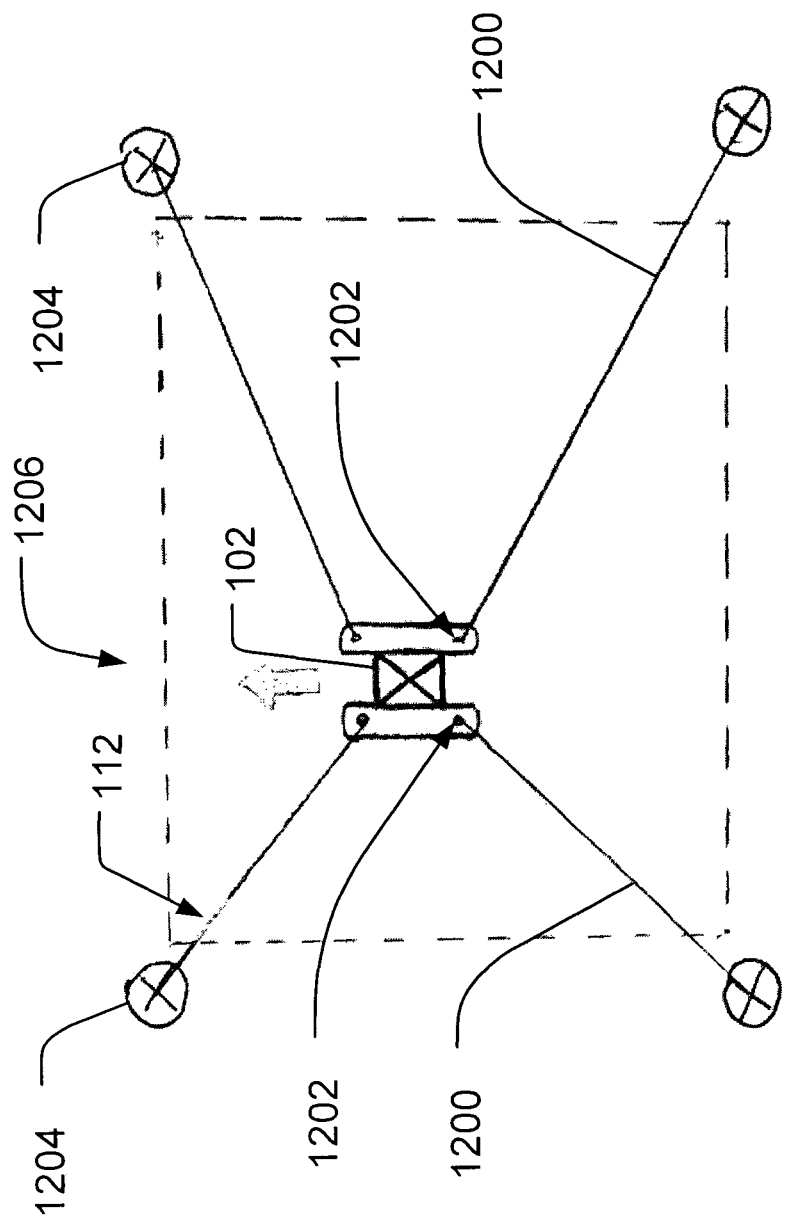
FIG. 12 illustrates the guiding apparatus of the seaweed farming system and a propulsion mechanism of the seaweed farm operating assembly, in accordance with another embodiment of the present subject matter.

FIG. 12 illustrates the guiding apparatus 104 and the propulsion mechanism 112, in accordance with another embodiment of the present subject matter. In said embodiment, the guiding apparatus 104 and the propulsion mechanism 112 are formed as a single unit, referred to as the guiding and propulsion mechanism 1206. In such a case, as previously described, the guiding and propulsion mechanism 1206 is responsible for the propelling and guiding the seaweed farm operating assembly 102 over the surface of water. In said embodiment, the guiding and propulsion mechanism 1206 can be a rope-based propulsion mechanism having a plurality of ropes 1200. In said embodiment, one end of a rope 1200 can be adjustably coupled at the seaweed farm operating assembly 102 and the other end of the rope 1202 can be fixed to an anchor 1204 at the bottom surface of the water body. Accordingly, in said embodiment, the guiding and propulsion mechanism 1206 can include a plurality of rope adjusting devices 1202, each to reel in or reel out the rope 1200, or to regulate a tension in the rope 1200 of the guiding and propulsion mechanism 1206. In an example the rope adjusting devices 1202 can be winches for reeling in or releasing a predetermined length of rope 1202, to regulate the movement of the seaweed farm operating assembly 102. In one case, the guiding and propulsion mechanism 1206 can be provided with three winches and correspondingly three anchors, each coupled to the respective rope 1200 provided at the respective winch. Based on the control of the rope adjusting devices 1202, say by way of a processor-based controlling unit, the movement of the seaweed farm operating assembly 102 can be effectively controlled on the surface of the water body.

Figure 13:
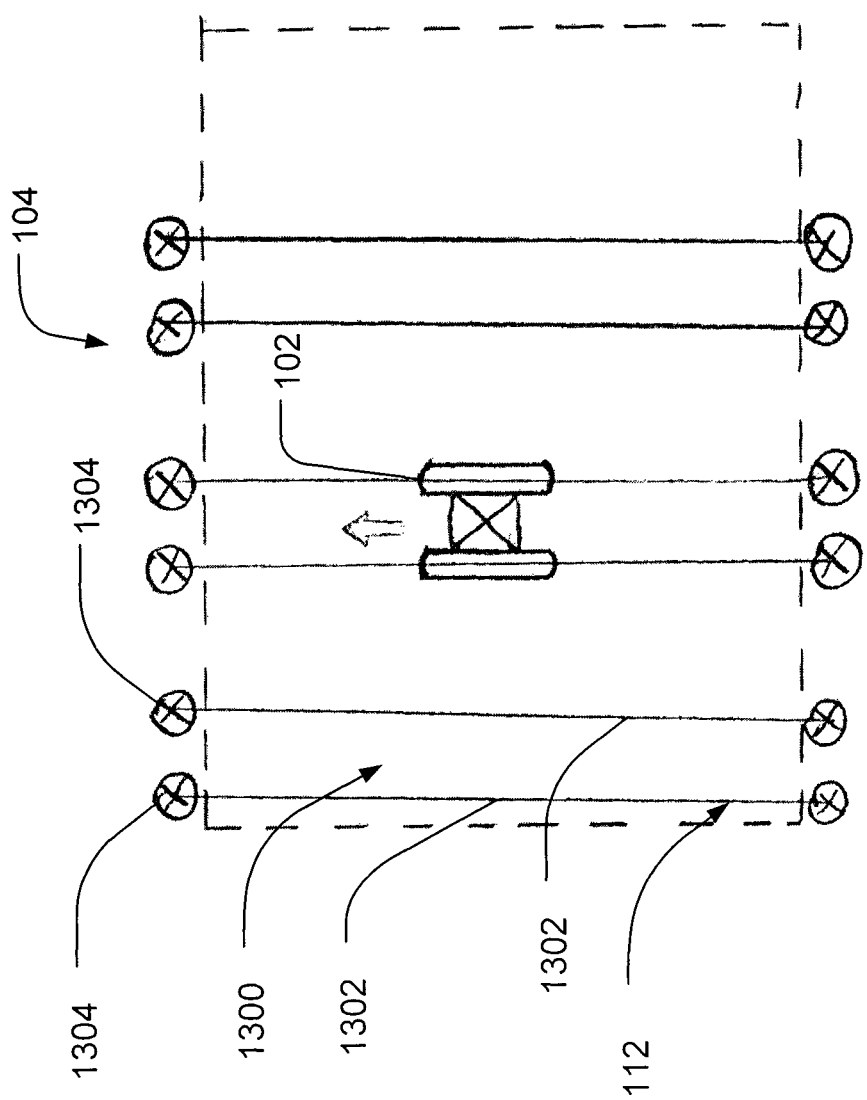
FIG. 13 illustrates the guiding apparatus of the seaweed farming system, in accordance with another implementation of the present subject matter.

FIG. 13 illustrates the guiding apparatus 104 of the seaweed farming system 100 and the propulsion mechanism 112 of the seaweed farm operating assembly 102, in accordance with another implementation of the present subject matter. In this case also, the guiding apparatus 104 can be a rope-based system. However in implementation, the guiding apparatus 104 can include a plurality of guiding rope sets 1300. In an example each guiding rope set 1300 can include one or more ropes 1302 fixed to anchors 1304 at the bottom surface of the water body. In said implementation, the seaweed farm operating assembly 102 can be propelled on the guiding rope set 1300 for harvesting and seeding the seaweed. In an example, the propulsion mechanism (not shown) of the seaweed farm operating assembly 102 can include grooved-pulleys or wheels coupled to an actuator to propel the seaweed farm operating assembly 102 in a similar manner as the propulsion mechanism of a cable car.

Accordingly, with reference to the above implementations, the propulsion mechanism 112 can allow the seaweed farm operating assembly 102 to move along the surface of water on the guide rails of the floating frame 1002. Further, as described previously, the plantation substrate 110 (not shown in figure) can be disposed on the floating frame 1002. As the seaweed farm operating assembly 102 moves over the guide rails, the plantation substrate 110 is drawn into the seaweed farm operating assembly 102 for harvesting and cultivating, in the manner described previously. Since, the seaweed farm operating assembly 102 is guided in a predictable manner, along a predefined path, the harvesting and cultivation of seaweed can be achieved effectively, preventing loss in time and other resources.

While the seaweed farming system 100 is described with reference to the operation for harvesting as well as seeding, the seaweed farming system 100 may be implemented individually for harvesting or seeding. Further, while the description above is substantially provided with reference to the seaweed farming system 100 as being a mobile unit and being capable of moving over the water surface for harvesting and re-planting the seaweed, the seaweed farming system 100 can be implemented as a static unit, as mentioned previously. In such a case, the various components of the seaweed farming system 100 would function in the same manner as described above, in accordance with the present subject matter.

Although embodiments for seaweed farming system 100 have been described in the language specific to structural features, it is to be understood that the invention is not necessarily limited to the specific features described. Rather, the specific features are disclosed and explained in the context of one of the embodiments of the seaweed farming system 100.

We claim:

1. A harvesting unit comprising:
   a harvest disintegrator, wherein the harvesting disintegrator is configured to:
   receive a plantation substrate having mature seaweed thereon after severing a vegetative portion of seaweed; and
   disintegrate the mature seaweed to separate the mature seaweed from the plantation substrate, wherein the plantation substrate remains substantially intact during separation of the mature seaweed.

2. The harvesting unit as claimed in claim 1, further comprising:
   a substrate puller to draw the plantation substrate for harvesting the mature seaweed;
   a seed cutter to sever the vegetative portion of seaweed from the mature seaweed in the plantation substrate; and
   a conveyor to carry the severed vegetative portion of seaweed to a seeding unit.

3. The harvesting unit as claimed in claim 1, further comprising a substrate separator to separate the plantation substrate from remaining mature seaweed.

4. The harvesting unit as claimed in claim 1, further comprising a substrate cutter to cut the plantation substrate such that remaining mature seaweed is separated from the plantation substrate.

5. The harvesting unit as claimed in claim 1, wherein the harvesting unit further comprises at least one crushing roller configured to pulverize the mature seaweed attached to the plantation substrate, wherein the plantation substrate substantially remains intact during the pulverization of the mature seaweed.

* * * * *